US010111221B2

(12) United States Patent
Wang

(10) Patent No.: US 10,111,221 B2
(45) Date of Patent: Oct. 23, 2018

(54) TRANSMISSION METHOD AND COMMUNICATIONS DEVICE

(71) Applicant: Huawei Technologies Co., Ltd., Shenzhen (CN)

(72) Inventor: Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 15/315,158

(22) PCT Filed: May 30, 2014

(86) PCT No.: PCT/CN2014/078986
§ 371 (c)(1),
(2) Date: Nov. 30, 2016

(87) PCT Pub. No.: WO2015/180162
PCT Pub. Date: Dec. 3, 2015

(65) Prior Publication Data
US 2017/0201985 A1    Jul. 13, 2017

(51) Int. Cl.
*H04W 4/00*    (2018.01)
*H04W 72/04*   (2009.01)
*H04W 56/00*   (2009.01)

(52) U.S. Cl.
CPC ... *H04W 72/0446* (2013.01); *H04W 56/0015* (2013.01)

(58) Field of Classification Search
CPC .................. H04W 72/0446; H04W 56/0015
USPC ................ 370/329–330, 335–338, 341–349
See application file for complete search history.

(56) References Cited

U.S. PATENT DOCUMENTS

| 9,750,019 | B2* | 8/2017 | Bala ................. H04W 72/0453 |
| 2013/0308568 | A1 | 11/2013 | Chen et al. |
| 2014/0036853 | A1* | 2/2014 | Kim .................... H04W 16/14 370/329 |

(Continued)

FOREIGN PATENT DOCUMENTS

| CN | 101268707 A | 9/2008 |
| CN | 103517456 A | 1/2014 |

(Continued)

OTHER PUBLICATIONS

Foreign Communication From A Counterpart Application, European Application No. 14892890.6, Extended European Search Report dated Mar. 27, 2017, 9 pages.

(Continued)

*Primary Examiner* — Thai Hoang
(74) *Attorney, Agent, or Firm* — Conley Rose, P.C.

(57) ABSTRACT

A transmission method and a communications device, and the method includes sending a first data frame to a second communications device using an unlicensed carrier, and sending M second data frames to the second communications device using a licensed carrier, where at least one data frame in the M second data frames carries first information, the first information includes information required for detecting the first data frame by the second communications device, and M is an integer not less than 1. According to the transmission method and the communications device, the energy consumption of the communications device can be reduced.

18 Claims, 11 Drawing Sheets

(56) References Cited

U.S. PATENT DOCUMENTS

| | | | |
|---|---|---|---|
| 2014/0036881 A1* | 2/2014 | Kim | H04L 5/001 |
| | | | 370/336 |
| 2014/0112289 A1* | 4/2014 | Kim | H04W 16/14 |
| | | | 370/329 |
| 2014/0341135 A1* | 11/2014 | Bhushan | H04W 28/0289 |
| | | | 370/329 |
| 2015/0131536 A1 | 5/2015 | Kaur et al. | |
| 2016/0105907 A1* | 4/2016 | Lee | H04W 16/14 |
| | | | 370/336 |
| 2016/0173249 A1* | 6/2016 | Kwon | H04L 5/0048 |
| | | | 370/329 |
| 2017/0142743 A1* | 5/2017 | Yoon | H04L 5/0048 |
| 2017/0202018 A1* | 7/2017 | Cha | H04W 74/0816 |
| 2017/0237539 A1* | 8/2017 | Xu | H04L 5/0055 |
| | | | 370/329 |
| 2017/0238190 A1* | 8/2017 | Yang | H04W 16/14 |
| | | | 370/329 |
| 2018/0110090 A1* | 4/2018 | Um | H04W 76/16 |

FOREIGN PATENT DOCUMENTS

| | | |
|---|---|---|
| CN | 103765824 A | 4/2014 |
| JP | 2014500685 A | 1/2014 |
| WO | 2012040520 A1 | 3/2012 |

OTHER PUBLICATIONS

Foreign Communication From A Counterpart Application, PCT Application No. PCT/CN2014/078986, English Translation of International Search Report dated Mar. 3, 2015, 2 pages.

Foreign Communication From A Counterpart Application, PCT Application No. PCT/CN2014/078986, English Translation of Written Opinion dated Mar. 3, 2015, 10 pages.

Foreign Communication From A Counterpart Application, Japanese Application No. 2017-514752, Japanese Office Action dated Jan. 23, 2018, 5 pages.

Foreign Communication From A Counterpart Application, Japanese Application No. 2017-514752, English Translation of Japanese Office Action dated Jan. 23, 2018, 5 pages.

* cited by examiner

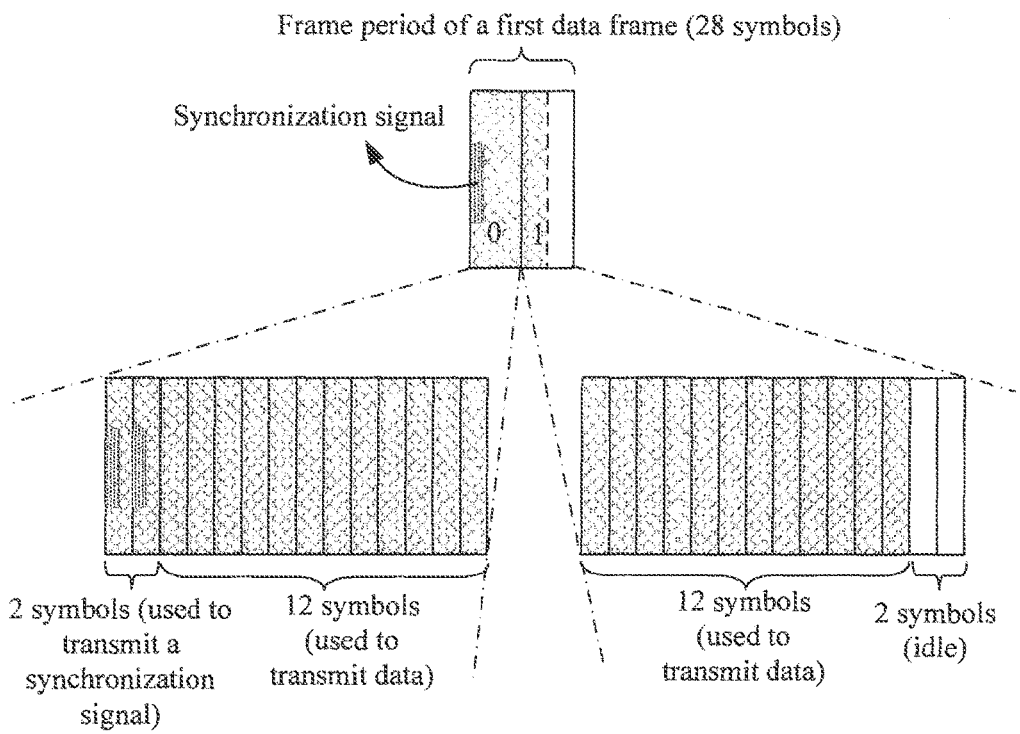

Receive M second data frames that are sent by a first communications device using a licensed carrier, where at least one data frame in the M second data frames carries first information, the first information includes information required for detecting a first data frame that is sent by the first communications device using an unlicensed carrier, and M is an integer not less than 1 — S210

Start to detect the first data frame according to the first information when or after the first information is obtained — S220

FIG. 7

TRANSMISSION METHOD AND COMMUNICATIONS DEVICE

CROSS-REFERENCE TO RELATED APPLICATIONS

This application is a U.S. National Stage of International Application No. PCT/CN2014/078986, filed on May 30, 2014, which is hereby incorporated by reference in its entirety.

TECHNICAL FIELD

Embodiments of the present disclosure relate to the communications field, and in particular, to a transmission method and a communications device.

BACKGROUND

Spectrums used in a wireless communications system are classified into a licensed spectrum and an unlicensed spectrum. For a licensed spectrum, generally, after a license is obtained, a corresponding licensed carrier may be used to provide a related communication service, and no resource competition problem exists. For example, in a Long Term Evolution (LTE) system, at a transmit end, each subsequent data frame is sent in sequence if an initial sending time of a data frame is determined. Accordingly, at a receive end, if the initial sending time of the data frame is acquired using a synchronization signal, a receiving time of each subsequent data frame is determined, and the receive end does not need to adjust the receiving time of each frame. For an unlicensed spectrum, anyone is authorized to use a corresponding unlicensed carrier to perform a communication service. However, for data transmission using an unlicensed carrier, data transmission starts only when a time resource is obtained by means of time-based competition, and after a period of time of transmission, sending must be stopped and a channel is released such that another device has an opportunity to occupy the channel.

Therefore, for an unlicensed carrier, the resource competition problem exists, and the transmit end cannot occupy the channel all the time to transmit data. Therefore, a moment at which data is sent varies with a moment at which a resource is successfully obtained by competition, and therefore, an original receiving mechanism for a licensed carrier is unsuitable to use for an unlicensed carrier. Currently, for a communications system that uses an unlicensed carrier, a receive end needs to detect a channel of the unlicensed carrier all the time. A biggest problem of this solution is heavy power consumption, which affects standby time of the receive end.

SUMMARY

Embodiments of the present disclosure provide a transmission method and a communications device, which can reduce energy consumption of the communications device.

According to a first aspect, a transmission method is provided, where the method includes sending a first data frame to a second communications device using an unlicensed carrier, and sending M second data frames to the second communications device using a licensed carrier, where at least one data frame in the M second data frames carries first information, the first information includes information required for detecting the first data frame by the second communications device, and M is an integer not less than 1.

With reference to the first aspect, in a first possible implementation manner of the first aspect, before the first data frame is sent, and when the M second data frames are sent to the second communications device using the licensed carrier, the first information includes information used to indicate a frame structure of the first data frame or information used to indicate a subframe structure of the first data frame.

With reference to the first aspect, in a second possible implementation manner of the first aspect, when the first data frame is sent or after the first data frame is sent, and when the M second data frames are sent to the second communications device using the licensed carrier, the first information includes at least one of a first time offset of the first data frame, information used to indicate a frame structure of the first data frame, information used to indicate a subframe structure of the first data frame, or second information used to trigger the second communications device to detect the first data frame on the unlicensed carrier.

With reference to the second possible implementation manner of the first aspect, in a third possible implementation manner of the first aspect, the first information includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

With reference to the third possible implementation manner of the first aspect, in a fourth possible implementation manner of the first aspect, the first time offset includes at least one type of the following information an absolute time difference, a quantity of collection points, and a quantity of symbols.

With reference to any possible implementation manner of the second to the fourth possible implementation manners of the first aspect, in a fifth possible implementation manner of the first aspect, the sending M second data frames to the second communications device using a licensed carrier includes sending the M second data frames to the second communications device using the licensed carrier when the first time offset of the first data frame changes compared with a third time offset of a third data frame, or the frame structure of the first data frame changes compared with a frame structure of the third data frame or the subframe structure of the first data frame changes compared with a subframe structure of the third data frame, where the third data frame is a data frame that is sent using the unlicensed carrier, the third data frame is a previous data frame of the first data frame, the third time offset represents a time difference between a start moment of the third data frame and a start moment of a fourth data frame, or the third time offset represents a time difference between a start moment of a subframe in the third data frame and a start moment of a subframe in the fourth data frame, the fourth data frame is a data frame that is sent using the licensed carrier, and the fourth data frame is a data frame before the M second data frames.

With reference to the fifth possible implementation manner of the first aspect, in a sixth possible implementation manner of the first aspect, the third time offset includes at least one type of the following information, an absolute time difference, a quantity of collection points, and a quantity of symbols.

With reference to the first aspect and any possible implementation manner of the first to the sixth possible implementation manners of the first aspect, in a seventh possible implementation manner of the first aspect, the subframe structure of the first data frame is as follows. A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

With reference to the first aspect and any possible implementation manner of the first to the sixth possible implementation manners of the first aspect, in an eighth possible implementation manner of the first aspect, the frame structure of the first data frame is as follows. A frame period of the first data frame includes a channel occupancy period and a channel idle period, and the channel idle period is at least 5% of the channel occupancy period.

With reference to the eighth possible implementation manner of the first aspect, in a ninth possible implementation manner of the first aspect, the frame structure of the first data frame is as follows. The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

According to a second aspect, a transmission method is provided, where the method includes receiving M second data frames that are sent by a first communications device using a licensed carrier, where at least one data frame in the M second data frames carries first information, the first information includes information required for detecting a first data frame that is sent by the first communications device using an unlicensed carrier, and M is an integer not less than 1, and starting to detect the first data frame according to the first information when or after the first information is obtained.

With reference to the second aspect, in a first possible implementation manner of the second aspect, the first information includes information used to indicate a frame structure of the first data frame or information used to indicate a subframe structure of the first data frame.

With reference to the second aspect, in a second possible implementation manner of the second aspect, the first information includes at least one of a first time offset of the first data frame, information used to indicate a frame structure of the first data frame, information used to indicate a subframe structure of the first data frame, or second information used to trigger detection of the first data frame on the unlicensed carrier.

With reference to the second possible implementation manner of the second aspect, in a third possible implementation manner of the second aspect, the first information includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

With reference to the third possible implementation manner of the second aspect, in a fourth possible implementation manner of the second aspect, the first time offset includes at least one type of the following information, an absolute time difference, a quantity of collection points, and a quantity of symbols.

With reference to the second possible implementation manner of the second aspect, in a fifth possible implementation manner of the second aspect, the first information includes the second information, and the starting to detect the first data frame according to the first information when or after the first information is obtained includes starting to detect a synchronization signal according to the second information, and determining a start moment of the first data frame when or after the second information is obtained, and detecting the first data frame according to the start moment of the first data frame.

With reference to the second aspect and any possible implementation manner of the first to the fifth possible implementation manners of the second aspect, in a sixth possible implementation manner of the second aspect, the frame structure of the first data frame is as follows. A frame period of the first data frame includes a channel occupancy period and a channel idle period, and the channel idle period is at least 5% of the channel occupancy period.

With reference to the sixth possible implementation manner of the second aspect, in a seventh possible implementation manner of the second aspect, the frame structure of the first data frame is as follows. The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

With reference to the second aspect and any possible implementation manner of the first to the fifth possible implementation manners of the second aspect, in an eighth possible implementation manner of the second aspect, the subframe structure of the first data frame is as follows a period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

According to a third aspect, a communications device is provided, where the communications device includes a first sending module configured to send a first data frame to a second communications device using an unlicensed carrier, and a second sending module configured to send M second data frames to the second communications device using a licensed carrier, where at least one data frame in the M second data frames carries first information, the first information includes information required for detecting the first data frame by the second communications device, and M is an integer not less than 1.

With reference to the third aspect, in a first possible implementation manner of the third aspect, the communications device further includes a first determining module configured to determine whether the first sending module has sent the first data frame, and when the first determining module determines that the first sending module has not sent the first data frame, the first information sent by the second sending module includes information used to indicate a frame structure of the first data frame or information used to indicate a subframe structure of the first data frame.

With reference to the third aspect, in a second possible implementation manner of the third aspect, the communications device further includes a first determining module configured to determine whether the first sending module has sent the first data frame, and when the first determining module determines that the first sending module is sending the first data frame, or the first sending module has sent the first data frame, the first information sent by the second sending module includes at least one of the following a first time offset of the first data frame, information used to indicate a frame structure of the first data frame, information used to indicate a subframe structure of the first data frame, or second information used to trigger the second communications device to detect the first data frame on the unlicensed carrier.

With reference to the second possible implementation manner of the third aspect, in a third possible implementation manner of the third aspect, the first information includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

With reference to the third possible implementation manner of the third aspect, in a fourth possible implementation manner of the third aspect, the first time offset includes at least one type of the following information, an absolute time difference, a quantity of collection points, and a quantity of symbols.

With reference to the third aspect and any possible implementation manner of the first to the fourth possible implementation manners of the third aspect, in a fifth possible implementation manner of the third aspect, the communications device further includes a second determining module configured to determine, whether the first time offset of the first data frame changes compared with a third time offset of a third data frame, or whether the frame structure of the first data frame changes compared with a frame structure of the third data frame, or whether the subframe structure of the first data frame changes compared with a subframe structure of the third data frame, and a triggering module configured to when the second determining module determines that the first time offset of the first data frame changes compared with the third time offset of the third data frame, or the frame structure of the first data frame changes compared with the frame structure of the third data frame, or the subframe structure of the first data frame changes compared with the subframe structure of the third data frame, trigger the second sending module to send the M second data frames, where the third data frame is a data frame that is sent using the unlicensed carrier, the third data frame is a previous data frame of the first data frame, the third time offset represents a time difference between a start moment of the third data frame and a start moment of a fourth data frame, or the third time offset represents a time difference between a start moment of a subframe in the third data frame and a start moment of a subframe in the fourth data frame, the fourth data frame is a data frame that is sent using the licensed carrier, and the fourth data frame is a data frame before the M second data frames.

With reference to the fifth possible implementation manner of the third aspect, in a sixth possible implementation manner of the third aspect, the third time offset includes at least one type of the following information, an absolute time difference, a quantity of collection points, and a quantity of symbols.

With reference to the third aspect and any possible implementation manner of the first to the sixth possible implementation manners of the third aspect, in a seventh possible implementation manner of the third aspect, the subframe structure of the first data frame sent by the first sending module is as follows. A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

With reference to the third aspect and any possible implementation manner of the first to the sixth possible implementation manners of the third aspect, in an eighth possible implementation manner of the third aspect, the frame structure of the first data frame sent by the first sending module is as follows. A frame period of the first data frame includes a channel occupancy period and a channel idle period, and the channel idle period is at least 5% of the channel occupancy period.

With reference to the eighth possible implementation manner of the third aspect, in a ninth possible implementation manner of the third aspect, the frame structure of the first data frame sent by the first sending module is as follows. The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

According to a fourth aspect, a communications device is provided, where the communications device includes a receiving module configured to receive M second data frames that are sent by a first communications device using a licensed carrier, where at least one data frame in the M second data frames carries first information, the first information includes information required for detecting a first data frame that is sent by the first communications device using an unlicensed carrier, and M is an integer not less than 1, and a detecting module configured to start to detect the first data frame according to the first information received by the receiving module when or after the first information is obtained.

With reference to the fourth aspect, in a first possible implementation manner of the fourth aspect, the first information received by the receiving module includes information used to indicate a frame structure of the first data frame or information used to indicate a subframe structure of the first data frame.

With reference to the fourth aspect, in a second possible implementation manner of the fourth aspect, the first information received by the receiving module includes at least one of a first time offset of the first data frame, information used to indicate a frame structure of the first data frame, information used to indicate a subframe structure of the first data frame, or second information used to trigger detection of the first data frame on the unlicensed carrier.

With reference to the second possible implementation manner of the fourth aspect, in a third possible implementation manner of the fourth aspect, the first information received by the receiving module includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

With reference to the third possible implementation manner of the fourth aspect, in a fourth possible implementation manner of the fourth aspect, the first time offset includes at least one type of the following information, an absolute time difference, a quantity of collection points, and a quantity of symbols.

With reference to the second possible implementation manner of the fourth aspect, in a fifth possible implementation manner of the fourth aspect, the first information received by the receiving module includes the second information, and the detecting module includes a first detecting unit configured to start to detect a synchronization signal according to the second information, and determine a start moment of the first data frame when or after the second information is obtained, and a second detecting unit configured to detect the first data frame according to the start moment that is of the first data frame and is determined by the first detecting unit.

With reference to the fourth aspect and any possible implementation manner of the first to the fifth possible implementation manners of the fourth aspect, in a sixth possible implementation manner of the fourth aspect, the frame structure of the first data frame detected by the detecting module is as follows. A frame period of the first data frame includes a channel occupancy period and a channel idle period, and the channel idle period is at least 5% of the channel occupancy period.

With reference to the sixth possible implementation manner of the fourth aspect, in a seventh possible implementation manner of the fourth aspect, the frame structure of the first data frame detected by the detecting module is as follows. The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

With reference to the fourth aspect and any possible implementation manner of the first to the fifth possible implementation manners of the fourth aspect, in a seventh possible implementation manner of the fourth aspect, the subframe structure of the first data frame detected by the detecting module is as follows. A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

Based on the foregoing technical solution, according to the transmission method and the communications device in the embodiments of the present disclosure, energy consumption of the communications device can be reduced.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 6A and FIG. 6B show still another schematic block diagrams of a first data frame according to an embodiment of the present disclosure;

FIG. 7 shows another schematic flowchart of a transmission method according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), an LTE system, an LTE Advanced (LTE-A) system, and a Universal Mobile Telecommunications System (UMTS).

It should also be understood that, in the embodiments of the present disclosure, a user equipment (UE) may also be referred to as a terminal, a mobile station (MS), a mobile terminal, or the like. The user equipment may communicate with one or more core networks using a radio access network (RAN). For example, the user equipment may be a mobile phone (or referred to as a "cellular" phone), a computer with a communication function, portable equipment, or the like, for example, the user equipment may also be a portable, pocket-sized, handheld, computer built-in, or vehicle-mounted mobile apparatus. The user equipment exchanges voice and/or data with the RAN.

In the embodiments of the present disclosure, a base station may be a base transceiver station (BTS) in the GSM or the CDMA, may also be a NodeB in the WCDMA, may further be an evolved NodeB (eNB or e-NodeB) in the LTE, and may further be any other network element device that has a wireless sending function, which is not limited in the embodiments of the present disclosure.

Figure 1:
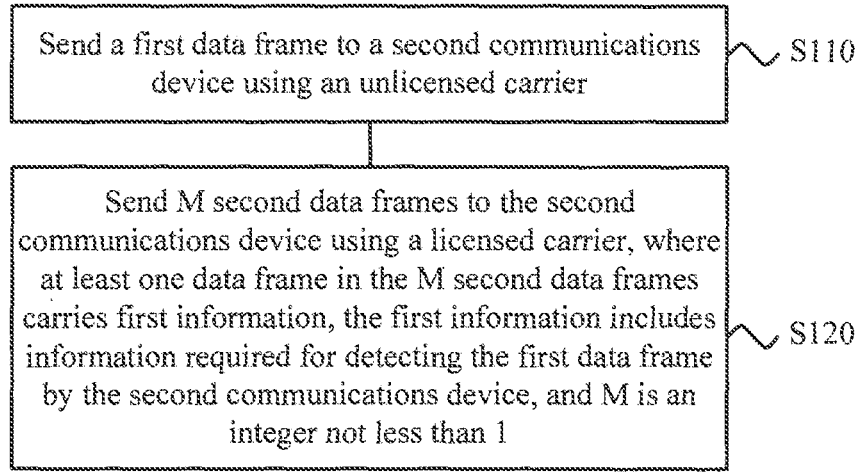
FIG. 1 shows a schematic flowchart of a transmission method according to an embodiment of the present disclosure.

FIG. 1 provides a schematic flowchart of a transmission method 100 according to an embodiment of the present disclosure. The method 100 may be performed by, for example, a first communications device, and the first communications device may be a user equipment, or may be a base station, or may be one chip or multiple chips. As shown in FIG. 1, the method 100 includes the following steps.

Step S110: Send a first data frame to a second communications device using an unlicensed carrier.

Step S120: Send M second data frames to the second communications device using a licensed carrier, where at least one data frame in the M second data frames carries first information, the first information includes information required for detecting the first data frame by the second communications device, and M is an integer not less than 1.

Therefore, according to the transmission method in this embodiment of the present disclosure, energy consumption of a communications device can be reduced.

In step S110, the first data frame is sent to the second communications device using the unlicensed carrier. It should be understood that, to transmit data using the unlicensed carrier, a resource competition means is used, and the first communications device transmits a signal using the unlicensed carrier when determining that an available resource is obtained on the unlicensed carrier by competition.

Optionally, in an embodiment, in the method 100 shown in FIG. 1, sending a first data frame to a second communications device using an unlicensed carrier includes determining whether the unlicensed carrier is occupied, and sending the first data frame to the second communications device using the unlicensed carrier when the unlicensed carrier is occupied.

In step S120, the M second data frames are sent to the second communications device using the licensed carrier, where the at least one data frame in the M second data frames carries the first information, the first information includes information required for detecting the first data frame by the second communications device. It should be understood that, when a data frame is sent using a licensed carrier, there is no resource competition problem, and the licensed carrier may be occupied all the time to send a data frame. For example, in an LTE system, each subsequent data frame is sent in sequence if an initial time of a data frame is determined. In this embodiment of the present disclosure, the M second data frames may be M successive data frames that are sent in sequence using the licensed carrier. That the at least one data frame in the M second data frames carries the first information refers to that one data frame or multiple data frames in the M second data frames carries or carry the first information. For example, one data frame (marked as a data frame B) in the M second data frames carries the first information, and further, each subframe in the data frame B may further carry the first information, which is not limited in this embodiment of the present disclosure.

It should also be understood that, in this embodiment of the present disclosure, there is no strict limitation on a time sequence of sending the first data frame and the M second data frames. The M second data frames may be sent using the licensed carrier before the first data frame is sent, or the M second data frames may be sent using the licensed carrier when the first data frame is sent using the unlicensed carrier, that is, the M second data frames are sent at a moment corresponding to a frame header of the first data frame, or the M second data frames may be sent using the licensed carrier after the first data frame is sent using the unlicensed carrier, which is not limited in this embodiment of the present disclosure. The foregoing several cases are described in detail in the following with reference to FIG. 2.

In step S120, the at least one data frame in the M second data frames that are sent using the licensed carrier carries the first information, and the first information includes the information required for detecting the first data frame by the second communications device. Further, for example, the first information may indicate a start moment or a frame structure or a subframe structure or the like of the first data frame, on which no special limitation is set in this embodiment of the present disclosure provided that the second communications device at a receive end can detect the first data frame according to the first information. The foregoing cases are described in detail in the following. It should also be understood that any one or more data frames in the M second data frames may carry the first information. Optionally, any one or more subframes in a data frame in the M second data frames may carry the first information, which is not limited in this embodiment of the present disclosure.

Figure 2A:
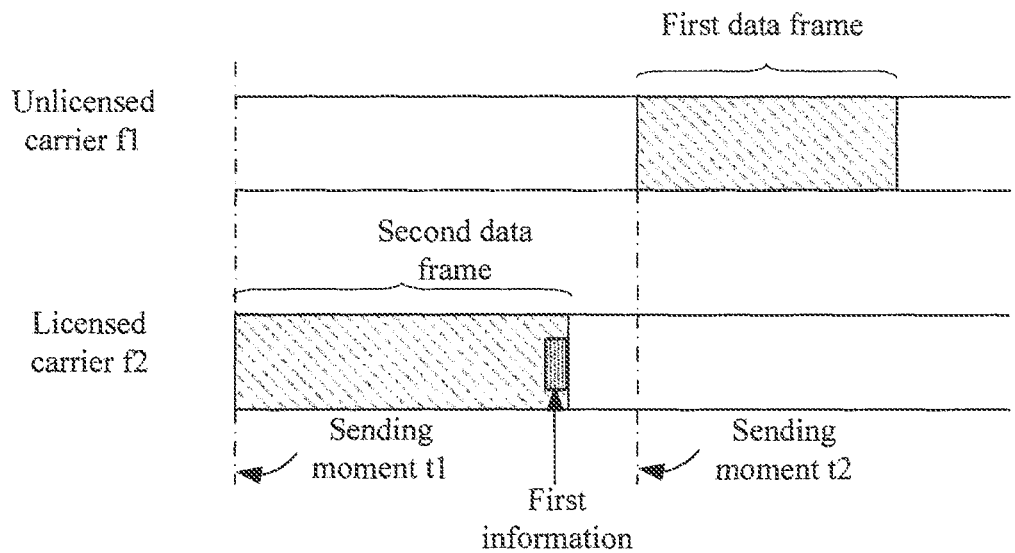
FIG. 2A, FIG. 2B, and FIG. 2C show schematic diagrams of a transmission method according to an embodiment of the present disclosure.
Figure 2B:
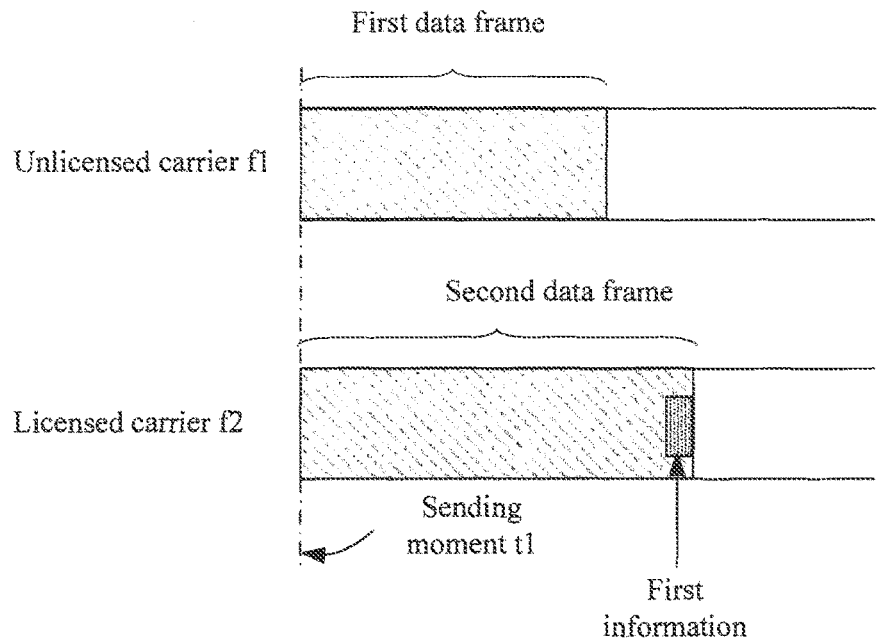
Figure 2C:
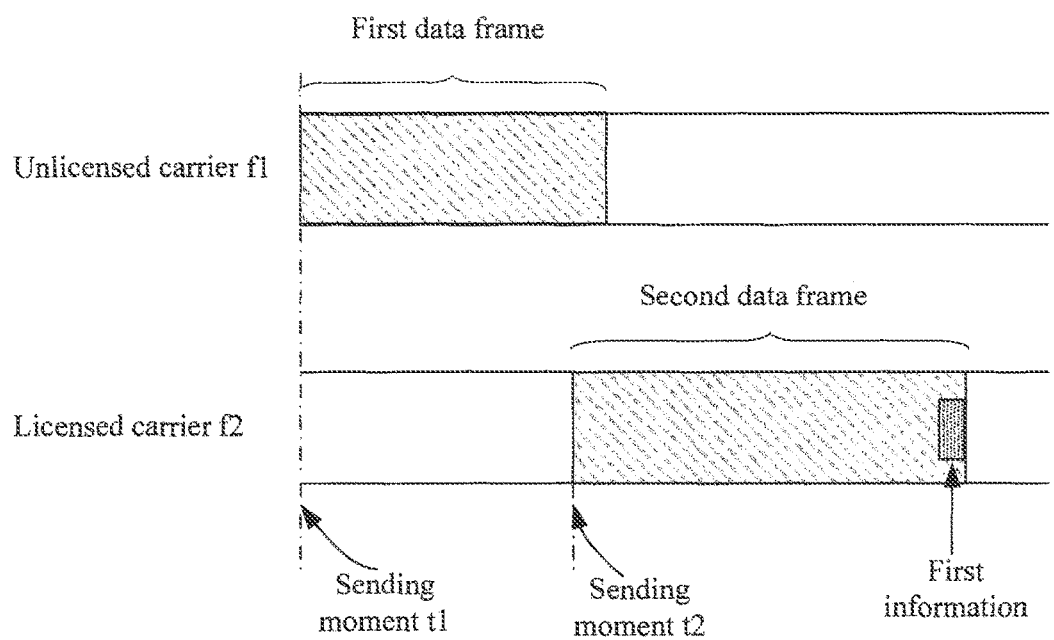

For ease of understanding, FIGS. 2A, 2B, and 2C shows several cases of a time sequence relationship between sending the first data frame by the first communications device using the unlicensed carrier and sending the M second data frames using the licensed carrier in this embodiment of the present disclosure. For ease of description, in FIGS. 2A, 2B, and 2C, it is assumed that a value of M is 1, that is, the first communications device sends one second data frame using the licensed carrier and the second data frame carries the first information.

Further, FIG. 2A shows case 1: The M second data frames are sent using the licensed carrier before the first data frame is sent using the unlicensed carrier.

As shown in FIG. 2A, at a sending moment t1, the second data frame is sent on a licensed carrier f2, and at a sending moment t2, the first data frame is sent on an unlicensed carrier f1, where t1 is earlier than t2 in a sending direction. That is, before the first data frame is sent, the second data frame is first occurred to the second communications device, and the second data frame carries the first information (as annotated in the figure), and the first information includes the information required for detecting the first data frame by the second communications device. Further, the first information may include information used to indicate the frame structure of the first data frame or information used to indicate the subframe structure of the first data frame.

It should be understood that a technical solution shown in FIG. 2A may be applied to the following scenario. For example, at the moment t1, the first communications device has not obtained a resource on the unlicensed carrier by competition, and cannot send the first data frame. However, as a transmit end, the first communications device learns the frame structure and/or the subframe structure of the first data frame in advance. Therefore, before obtaining the resource on the unlicensed carrier by competition, the first communications device may first notify the second communications device of the frame structure or the subframe structure of the first data frame such that the second communications device subsequently can detect the first data frame on the unlicensed carrier according to the frame structure or the subframe structure of the first data frame. Further, for example, the second communications device may determine the start moment of the first data frame by detecting a synchronization signal, and then detect the first data frame on the f1 according to the start moment and the frame structure (or the subframe structure) of the first data frame. The second communications device acquires the frame structure (or the subframe structure) of the first data frame. Therefore, time required for detecting the first data frame can be shortened, thereby reducing energy consumption of the second communications device. Optionally, when acquiring the first information, the second communications device may start to detect the synchronization signal on the f1, which may avoid a problem that, to acquire the start moment of the first data frame, the synchronization signal is continuously detected on the f1, and can further reduce the energy consumption of the second communications device.

Optionally, in an embodiment, in the method 100 shown in FIG. 1, before the first data frame is sent, and when the M second data frames are sent to the second communications device using the licensed carrier, the first information includes the information used to indicate the frame structure of the first data frame or the information used to indicate the subframe structure of the first data frame.

The information used to indicate the frame structure of the first data frame includes any information that may indicate the frame structure of the first data frame, and the information used to indicate the subframe structure of the first data frame includes any information that may indicate the subframe structure of the first data frame, which are not limited in this embodiment of the present disclosure.

FIG. 2B shows case 2: The M second data frames are sent using the licensed carrier when the first data frame is sent using the unlicensed carrier, that is, the second data frame is sent on the licensed carrier f2 at the sending moment t1 corresponding to the frame header of the first data frame.

FIG. 2C shows case 3: The M second data frames are sent using the licensed carrier after the first data frame is sent using the unlicensed carrier.

It should be understood that case 3 shown in FIG. 2C may further be the following extreme case. The M second data frames are sent using the licensed carrier only after the entire first data frame is sent using the unlicensed carrier, which is not limited in this embodiment of the present disclosure.

Cases shown in FIG. 2B and FIG. 2C may be applied to the following scenario. The first communications device determines that the resource is obtained on the unlicensed carrier by competition, and sends the first data frame to the second communications device using the unlicensed carrier, and then (including at the same time), the first communications device sends the first information using the licensed carrier. In this case, because the first communications device learns a start sending time, the frame structure, the subframe structure, or other information of the first data frame, the first information may include any one or more types of the following information, a first time offset of the first data frame, information used to indicate the frame structure of the first data frame, information used to indicate the subframe structure of the first data frame, or second information used to trigger the second communications device to detect the first data frame on the unlicensed carrier.

Optionally, in an embodiment, in step S120 of the method 100 shown in FIG. 1, when the first data frame is sent or after the first data frame is sent, and when the M second data frames are sent to the second communications device using the licensed carrier, the first information includes at least one of the first time offset of the first data frame, the information used to indicate the frame structure of the first data frame, the information used to indicate the subframe structure of the first data frame, or the second information used to trigger the second communications device to detect the first data frame on the unlicensed carrier.

The first time offset of the first data frame is used to indicate the start moment of the first data frame. Further, in FIG. 2C, the first time offset may be a time difference (t2−t1), and the first time offset is described in detail in the following with reference to FIG. 3A and FIG. 3B. The second information is used to trigger the second communications device to detect the first data frame on the unlicensed carrier, that is, the second information may be considered as a trigger signal. That is, after receiving the second information, the second communications device may detect the first data frame on the unlicensed carrier. The information used to indicate the frame structure of the first data frame is used to indicate the frame structure of the first data frame, and the information used to indicate the subframe structure of the first data frame is used to indicate the subframe structure of the first data frame. The frame structure of the first data frame and the subframe structure of the first data frame are described in detail in the following with reference to FIGS. 3A, 3B, 4, 5A, 5B, 5C, 6A, and 6B.

Optionally, in an embodiment, in the transmission method 100 shown in FIG. 1, the first information includes the first time offset of the first data frame, and the first time offset represents a time difference between the start moment of the first data frame and a start moment of a data frame in the M second data frames, or the first time offset represents a time difference between a start moment of a subframe in the first data frame and a start moment of a subframe in a data frame in the M second data frames.

Figure 3A:
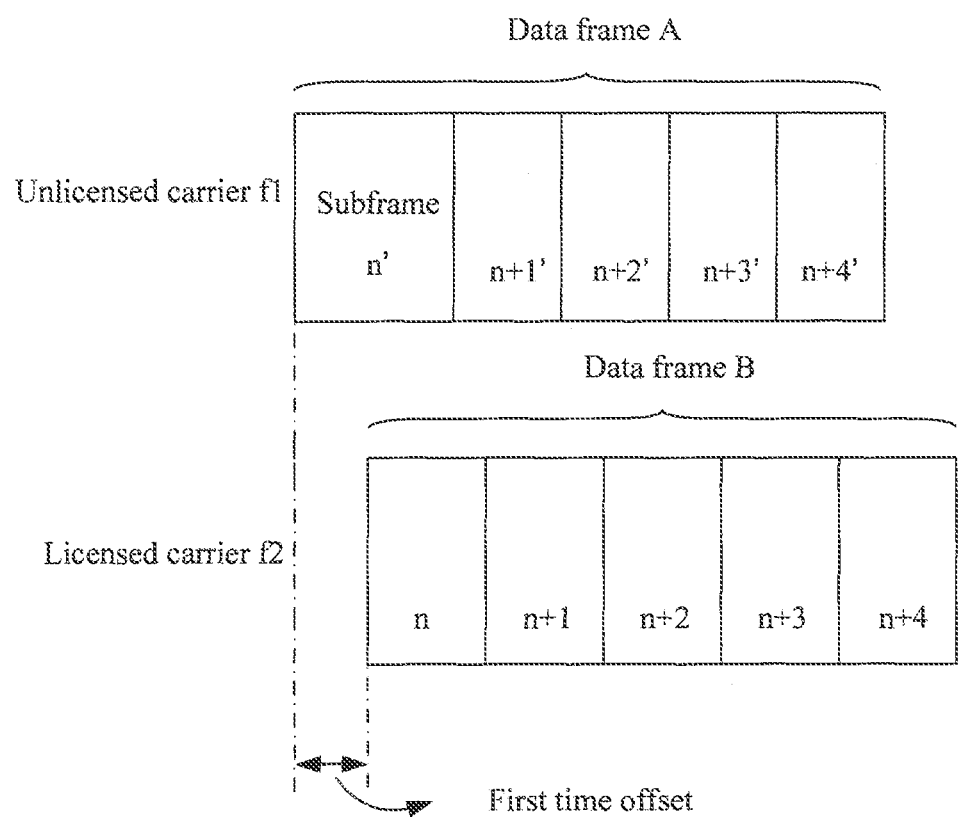
FIG. 3A and FIG. 3B show schematic diagrams of a first time offset according to an embodiment of the present disclosure.

Further, FIG. 3A shows that after a data frame A is sent on the unlicensed carrier f1, a data frame B is sent on the licensed carrier f2. That is, the first time offset in FIG. 3A is a time difference between a start moment of the data frame A and a start moment of the data frame B. For example, the first information sent by the first communications device to the second communications device includes the first time offset. Accordingly, the second communications device at the receive end may acquire the start moment of the data frame A according to the first time offset and the start moment of the data frame B such that the data frame A can be detected on the unlicensed carrier according to the start moment of the data frame A.

Alternatively, the first time offset may be a time difference between a start moment of a subframe in the first data frame and a start moment of a subframe in a data frame in the M second data frames.

Figure 3B:
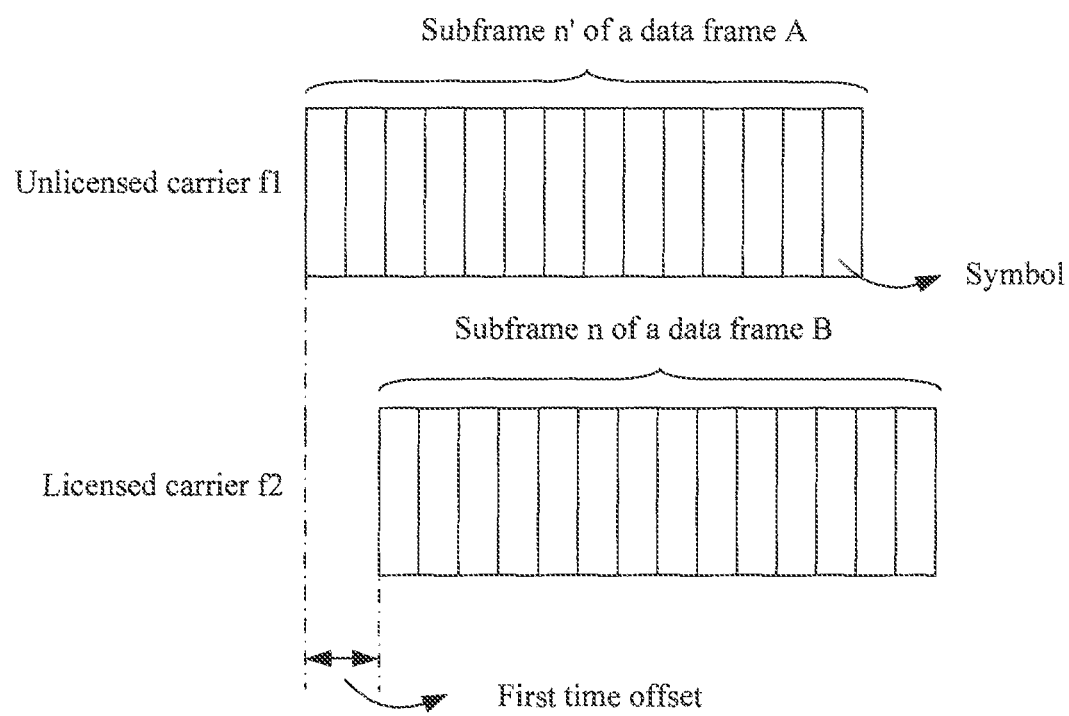

Further, still as shown in FIG. 3A, after the data frame A is sent using the unlicensed carrier f1, the data frame B is sent using the licensed carrier f2, where the data frame A includes subframes n', n+1', n+2', n+3', and n+4', and the data frame B includes subframes n, n+1, n+2, n+3, and n+4. That is, the first time offset may be used to indicate a time difference between start moments of subframe n' and subframe n, a time difference between start moments of subframe n+1' and subframe n+1, a time difference between start moments of subframe n+2' and subframe n+2, a time difference between start moments of subframe n+3' and subframe n+3, and a time difference between start moments of subframe n+4' and subframe n+4. Further, FIG. 3B shows an enlarged diagram of subframe n' and subframe n. It can be learned that there is a difference of several symbols between the start moments of subframe n' and subframe n, and the first time offset in FIG. 3B is used to indicate the time difference between the start moments of subframe n' and subframe n. Further, for example, the first information sent by the first communications device to the second communications device includes the first time offset. Accordingly, the second communications device at the receive end may acquire a start moment of subframe n' according to the first time offset and a start moment of subframe n. Similarly, may acquire start moments of subframes n+1', n+2', n+3', and n+4' according to a same method in order to detect subframes n+1', n+2', n+3', and n+4' in sequence on the unlicensed carrier such that the entire data frame A can be detected.

It should be understood that, optionally, in this embodiment of the present disclosure, the first data frame may be corresponding to the data frame A in FIG. 3, and any data frame in the M second data frames may be corresponding to the data frame B in FIG. 3.

It should also be understood that, in this embodiment of the present disclosure, the first information is not necessarily carried in a reference data frame or a reference subframe that defines the first time offset. Further, for example, in FIG. 3A, the first time offset represents the time difference between the start moment of the data frame B and the start moment of the data frame A. However, the first information that includes the first time offset is not necessarily carried in the data frame B. Optionally, the first information may be carried in the data frame B, or may be carried in any one or more data frames that are adjacent or nonadjacent to the data frame B. Still for example, in FIG. 3B, the first time offset represents the time difference between the start moment of subframe n in the data frame B and the start moment of subframe n' in the data frame A. However, the first information that includes the first time offset is not necessarily carried in subframe n. Optionally, the first information may be carried in any subframe in the data frame B, or may be carried in any one or more data frames that are adjacent or nonadjacent to the data frame B, which is not limited in this embodiment of the present disclosure.

It should also be understood that, in this embodiment of the present disclosure, the first time offset of the first data frame may be absolute time, may also be a quantity of collection points, and may further be a quantity of symbols.

Optionally, in an embodiment, in the transmission method 100 shown in FIG. 1, the first time offset includes at least one type of the following information, an absolute time difference, a quantity of collection points, and a quantity of symbols.

Further, for example, the first time offset in FIG. 3A may be an absolute time difference between the start moment of the data frame A and the start moment of the data frame B, or may be a quantity of collection points in the time difference between the start moment of the data frame A and the start moment of the data frame B, or may be a quantity of symbols in the time difference between the start moment of the data frame A and the start moment of the data frame B. Still for example, the first time offset in FIG. 3B may be an absolute time difference between the start moments of subframe n and subframe n', or may be a quantity of collection points in time the difference between the start moments of subframe n and subframe n', or may be a quantity of symbols in the time difference between the start moments of subframe n and subframe n'.

Further, in this embodiment of the present disclosure, a symbol may be a unit of time. For example, one symbol may represent ($1/12$) milliseconds (ms). When one data frame includes 5 subframes and each subframe includes 12 symbols, each subframe in the data frame is 1 ms and a frame period of the data frame is 5 ms.

It should be understood that the data frame A in FIGS. 3A and 3B may be corresponding to the first data frame in this embodiment of the present disclosure, and the data frame B may be corresponding to any data frame in the M second data frames in this embodiment of the present disclosure.

It should also be understood that, in this embodiment of the present disclosure, in addition to the first time offset of the first data frame, the information used to indicate the frame structure of the first data frame, the information used to indicate the subframe structure of the first data frame, or the second information used to trigger the second communications device to detect the first data frame on the unlicensed carrier, the first information may further include other information that is about the first data frame and is learned by the first communications device, which is not limited in this embodiment of the present disclosure provided that the other information facilitates detection of the first data frame by the second communications device on the unlicensed carrier.

The frame structure and the subframe structure of the first data frame that is sent using the unlicensed carrier in this embodiment of the present disclosure are described in detail in the following with reference to FIGS. 4, 5A, 5B, 5C, 6A, and 6B.

Optionally, in an embodiment, in the transmission method 100 shown in FIG. 1, the frame structure of the first data frame is as follows.

A frame period of the first data frame includes a channel occupancy period and a channel idle period, and the channel idle period is at least 5% of the channel occupancy period.

Figure 4:
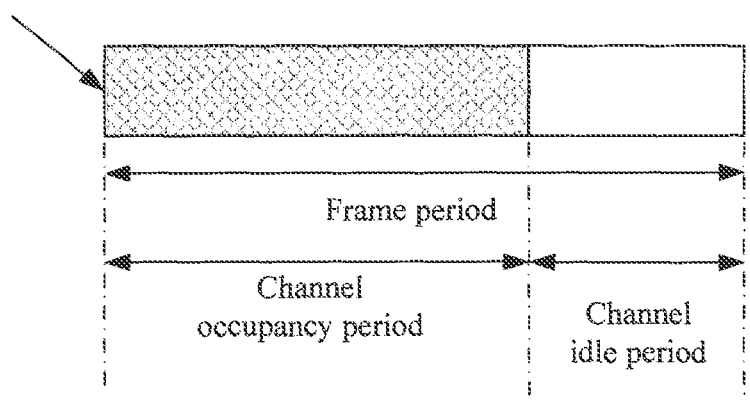
FIG. 4 shows a schematic block diagram of a first data frame according to an embodiment of the present disclosure.

Further, as shown in FIG. 4, the frame period of the first data frame includes the channel occupancy period and the channel idle period, and the channel idle period is at least 5% of the channel occupancy period, where the channel occupancy period is used to transmit data, and the channel idle period is in an idle state, that is, not used to transmit data.

Optionally, in an embodiment, in the transmission method 100 shown in FIG. 1, the frame structure of the first data frame is as follows.

The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

Figure 5A:
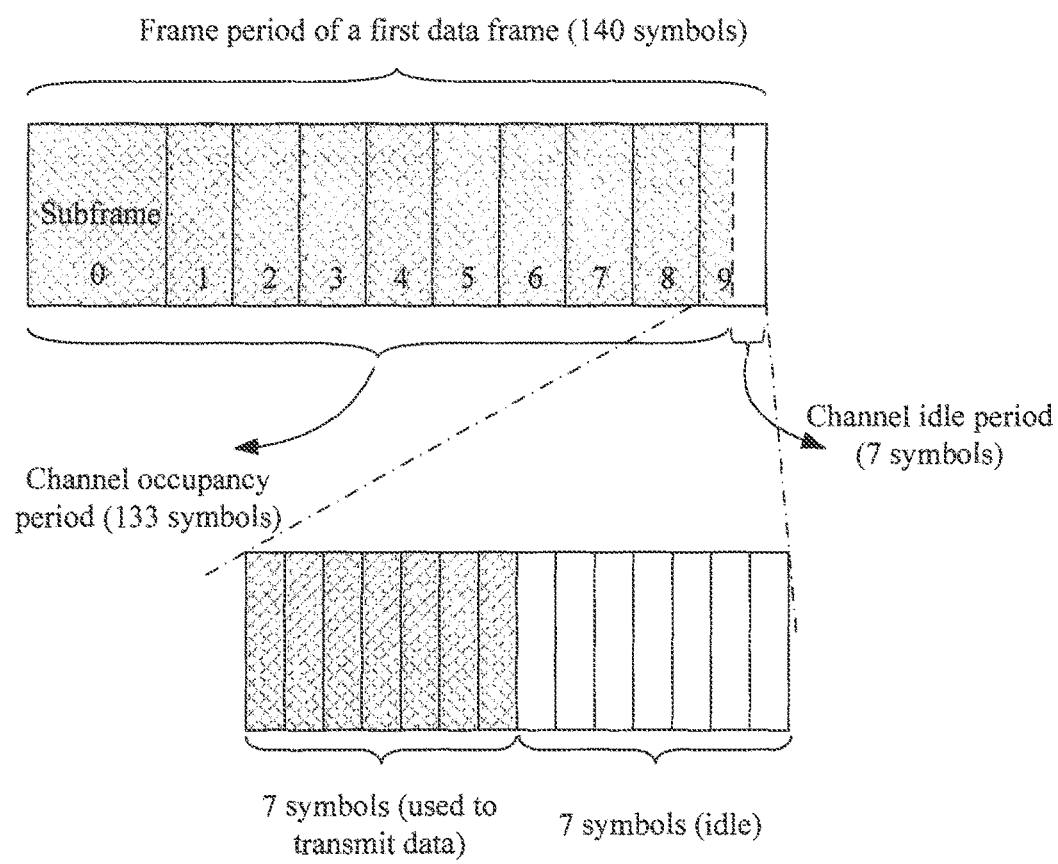
FIG. 5A, FIG. 5B, and FIG. 5C show another schematic block diagrams of a first data frame according to an embodiment of the present disclosure.

Further, FIG. 5A shows a case in which a frame structure has a frame period of 140 symbols, as shown in FIG. 5A, the first data frame includes 10 subframes, each subframe includes 14 symbols, and the frame period of the first data frame includes 140 symbols, where a channel occupancy period includes 133 symbols, and a channel idle period includes 7 symbols. Further, the channel occupancy period includes previous 9 subframes and previous 7 symbols of the 10th subframe, and the channel idle period includes last 7 symbols of the 10th subframe.

Figure 5B:
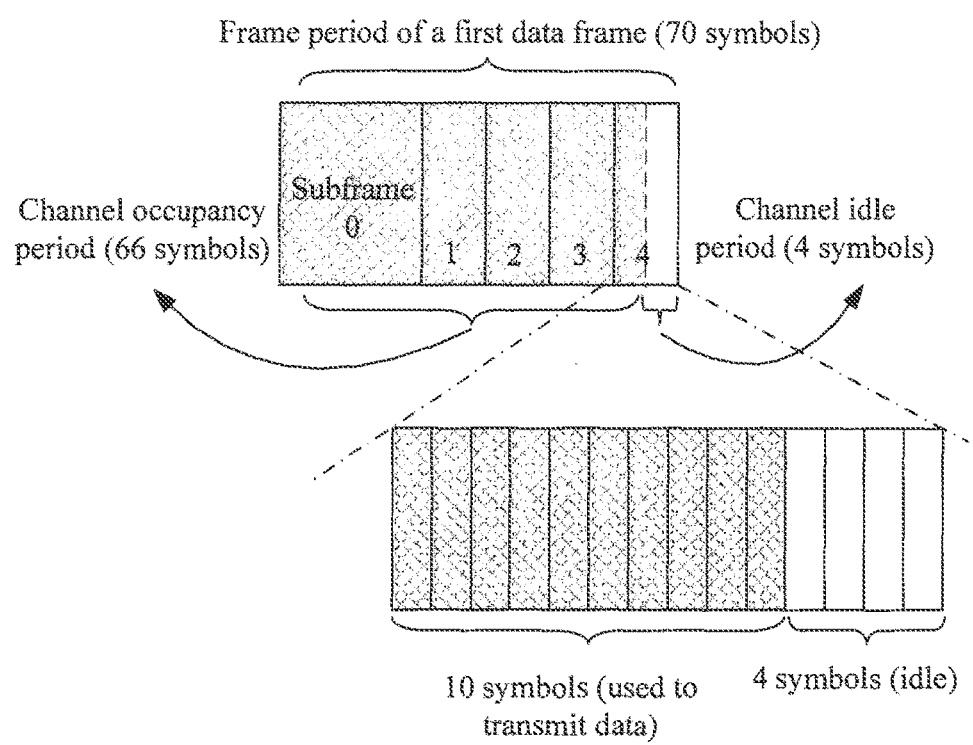

FIG. 5B shows a case in which a frame structure has a frame period of 70 symbols, as shown in FIG. 5B, the first data frame includes 5 subframes, each subframe includes 14 symbols, and the frame period of the first data frame includes 70 symbols, where a channel occupancy period includes 66 symbols, and a channel idle period includes 4 symbols. Further, the channel occupancy period includes previous 4 subframes and previous 10 symbols of the $5^{th}$ subframe, and the channel idle period includes last 4 symbols of the $10^{th}$ subframe.

Figure 5C:
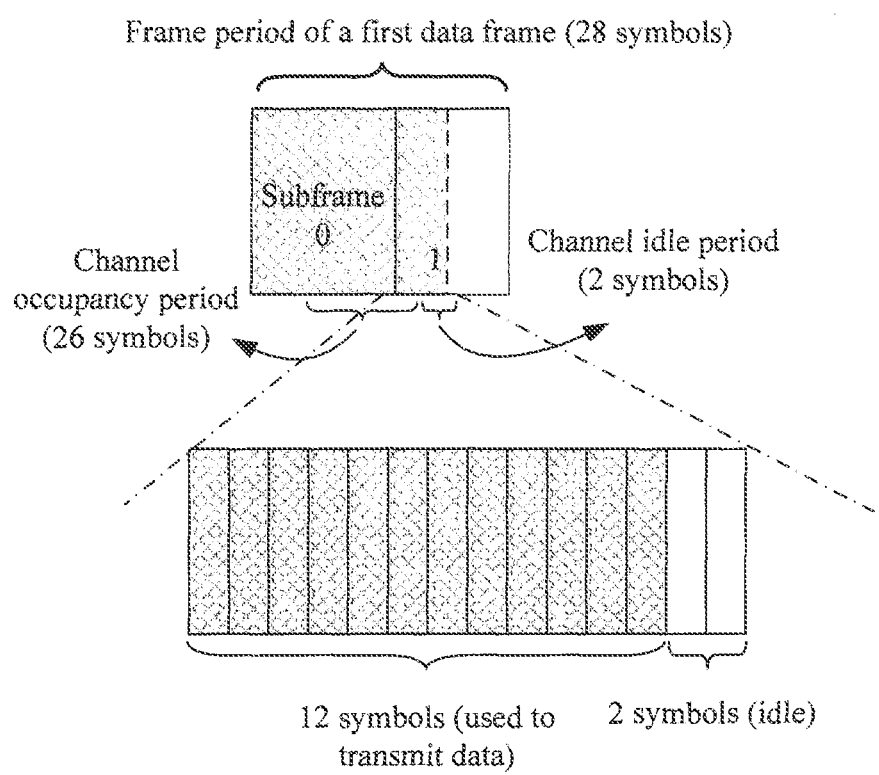

FIG. 5C shows a case in which a frame structure has a frame period of 28 symbols, as shown in FIG. 5C, the first data frame includes 2 subframes, each subframe includes 14 symbols, and the frame period of the first data frame includes 28 symbols, where a channel occupancy period includes 26 symbols, and a channel idle period includes 2 symbols. Further, the channel occupancy period includes a subframe 0 and previous 12 symbols of a subframe 1, and the channel idle period includes last 2 symbols of the subframe 1.

In frame structures of the first data frame shown in FIGS. 5A, 5B, and 5C, subframes included in the data frame all include 14 symbols, where the symbol may further represent (1/14) ms. Accordingly, the frame structures of the first data frame shown in FIGS. 5A, 5B, and 5C may further be respectively described as follows.

In FIG. 5A, the frame period of the first data frame is 10 ms, the channel occupancy period of the first data frame is 9.5 ms, and the channel idle period is 0.5 ms.

In FIG. 5B, the frame period of the first data frame is 5 ms, the channel occupancy period of the first data frame is 4.715 ms, and the channel idle period is 0.285 ms.

In FIG. 5C, the frame period of the first data frame is 2 ms, the channel occupancy period of the first data frame is 1.8573 ms, and the channel idle period is 0.1427 ms.

It should be understood that the symbol may further represents any other unit of time such as (1/12) ms, and symbols are not required to be strictly equal. For example, a symbol is (2208/30720) ms, and a symbol is (2192/30720) ms, which is not limited in this embodiment of the present disclosure.

Alternatively, the frame structure of the first data frame may be as follows.

The frame period of the first data frame includes 120 symbols, where the channel occupancy period includes 114 symbols, and the channel idle period includes 6 symbols. Further, the first data frame may include 10 subframes, and each subframe includes 12 symbols, where the signal occupancy period includes 114 symbols that are equivalent to previous 9 subframes and previous 6 symbols of the last subframe, and the channel idle period includes 6 symbols, that is, last 6 symbols of the last subframe. Further, when one symbol represents (1/12) ms, the frame structure of the first data frame may further be described as follows. The frame period of the first data frame is 10 ms, the channel occupancy period of the first data frame is 9.5 ms, and the channel idle period is 0.5 ms.

Alternatively, the frame structure of the first data frame may be as follows.

The frame period of the first data frame includes 60 symbols, where the channel occupancy period includes 56 symbols, and the channel idle period includes 4 symbols. Further, the first data frame may include 5 subframes, and each subframe includes 12 symbols, where the signal occupancy period includes 56 symbols that are equivalent to previous 4 subframes and previous 8 symbols of the last subframe, and the channel idle period includes 4 symbols, that is, last 4 symbols of the last subframe. Further, when one symbol represents (1/12) ms, the frame structure of the first data frame may further be described as follows. The frame period of the first data frame is 5 ms, the channel occupancy period of the first data frame is 4.667 ms, and the channel idle period is 0.333 ms.

Alternatively, the frame structure of the first data frame may be as follows.

The frame period of the first data frame includes 24 symbols, where the channel occupancy period includes 22 symbols, and the channel idle period includes 2 symbols. Further, the first data frame may include 2 subframes, and each subframe includes 12 symbols, where the signal occupancy period includes 22 symbols that are equivalent to the first subframe and previous 10 symbols of the second subframe, and the channel idle period includes 2 symbols, that is, last 2 symbols of the second subframe. Further, when one symbol represents (1/12) ms, the frame structure of the first data frame may further be described as follows. The frame period of the first data frame is 2 ms, the channel occupancy period of the first data frame is 1.833 ms, and the channel idle period is 0.167 ms.

It should be understood that the foregoing descriptions and FIGS. 5A, 5B, and 5C list only limited several frame structures of the first data frame, which is not limited in this embodiment of the present disclosure. For example, on condition that the frame period of the first data frame includes the channel occupancy period and the channel idle period and the channel idle period is not less than 5% of the channel occupancy period, the frame structure of the first data frame may further be, for example, any other form than the one shown in FIG. 4. In addition, in this embodiment of the present disclosure, in addition to (1/14) ms or (1/12) ms, the symbol may further represents another unit of time, which is not limited in the present disclosure.

In the foregoing, the frame structure of the first data frame is described with reference to FIGS. 4, 5A, 5B, and 5C, and in the following, the subframe structure of the first data frame in this embodiment of the present disclosure is described in detail with reference to FIGS. 5A, 5B, 5C, 6A, and 6B.

Optionally, in an embodiment, in the transmission method 100 shown in FIG. 1, the subframe structure of the first data frame is as follows.

A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

Further, as shown in FIGS. 5A, 5B, 5C, 6A, and 6B, subframe structures of subframe 0 to subframe 8 in FIG. 5A, subframe 0 to subframe 3 in FIG. 5B, and subframe 0 in FIG. 5C are all as follows.

A period of a subframe includes 14 symbols, where 14 symbols are used to transmit data.

A subframe structure of subframe 9 (referring to an enlarged diagram) in FIG. 5A is as follows.

A period of the subframe includes 14 symbols, where 7 symbols are used to transmit data, and 7 symbols are idle.

A subframe structure of subframe 4 in FIG. 5B is as follows.

A period of the subframe includes 14 symbols, where 10 symbols are used to transmit data, and 4 symbols are idle.

Figure 6A:
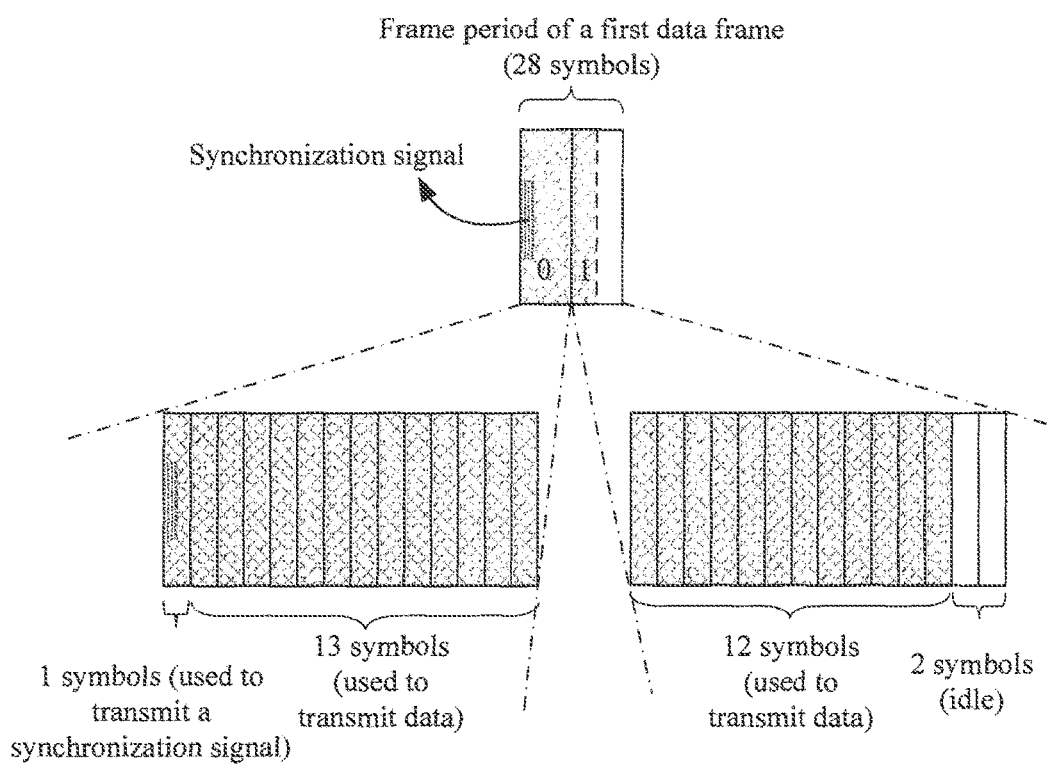

Subframe structures of subframes 1 in FIG. 5C, FIG. 6A, and FIG. 6B are all as follows.

A period of a subframe includes 14 symbols, where 12 symbols are used to transmit data, and 2 symbols are idle.

A subframe structure of subframe 0 in FIG. 6A is as follows.

A period of the subframe includes 14 symbols, where 1 symbol is used to transmit a synchronization signal.

A subframe structure of subframe 0 in FIG. 6B is as follows.

A period of the subframe includes 14 symbols, where 2 symbols are used to transmit a synchronization signal.

It should be understood that different subframes included in the first data frame may have different subframe structures, and FIGS. 5A, 5B, 5C, 6A, and 6B exemplarily provide only several subframe structures of the first data frame, which is not limited in this embodiment of the present disclosure. For example, subframes 0 in the data frame shown in FIG. 5A and FIG. 5C may also include a synchronization signal.

In this embodiment of the present disclosure, the information that is used to indicate the subframe structure of the first data frame and included in the first information may be any symbol or indication used to indicate the subframe structure. For example, a combination "01" of digits may be used to represent a subframe structure that is only used to transmit data, a combination "11" of digits represents a subframe structure that includes an idle state, and a combination "10" of digits represents a subframe structure that includes a synchronization signal. Alternatively, a subframe structure may be indicated using a bitmap method. For example, the subframe structure that includes a synchronization signal may be represented by 0011111111111, a common subframe structure that is only used to transmit data may be represented by 11111111111, and the subframe structure that includes an idle state may be represented by 11111111110000, which is not limited in this embodiment of the present disclosure.

It should be understood that examples shown in FIGS. 2A, 2B, 2C, 3A, 3B, 4, 5A, 5B, 5C, 6A, and 6B are used to help a person skilled in the art to better understand the embodiments of the present disclosure, but are not intended to limit the scope of the embodiments of the present disclosure. A person skilled in the art certainly can make various modifications or changes according to examples provided in FIGS. 2A, 2B, 2C, 3A, 3B, 4, 5A, 5B, 5C, 6A, and 6B, and such modifications or changes also fall within the scope of the present disclosure.

In this embodiment of the present disclosure, in step S120, when the first data frame is sent or after the first data frame is sent, the M second data frames are sent to the second communications device using the licensed carrier, where the first information carried in the at least one data frame in the M second data frames includes at least one type of information of the following information, the first time offset of the first data frame, the information used to indicate the frame structure of the first data frame, the information used to indicate the subframe structure of the first data frame, and the second information used to trigger the detection of the first data frame on the unlicensed carrier. The first information that is used to indicate the first data frame is sent to the second communications device on the licensed carrier such that the second communications device detects the first data frame on the unlicensed carrier. The first information may include any of the foregoing four types of information, or may include multiple types of the foregoing four types of information, which is not limited in this embodiment of the present disclosure. Several different cases are described in detail in the following.

In case 1, when a system has predefined the frame structure and/or the subframe structure of the first data frame that is sent using the unlicensed carrier, that is, when both the transmit end (the first communications device) and the receive end (the second communications device) learn the frame structure or the subframe structure of the first data frame that is transmitted using the unlicensed carrier, in this scenario, the first information may include only the first time offset of the first data frame or include only the second information used to trigger the detection of the first data frame on the unlicensed carrier.

(1) When the first information includes only the first time offset of the first data frame, and the first time offset represents a time difference between the start moment of the first data frame and a start moment of a data frame in the M second data frames that are sent using the licensed carrier, the second communications device may determine the start moment of the first data frame according to the first time offset, and detect the first data frame on the unlicensed carrier according to the start moment. Optionally, the first data frame may be detected on the unlicensed carrier according to the start moment and the frame structure or the subframe structure that is of the first data frame and is predefined by the system. Further, FIGS. 3A and 3B are used as an example. If it is assumed that the data frame A is the first data frame, and the data frame B is a data frame in the M second data frames, the second communications device may determine the start moment of the data frame A according to the first time offset and the start moment of the data frame B, and detect the data frame A on the unlicensed carrier according to the start moment.

When the first time offset represents a time difference between a start moment of a subframe in the first data frame and a start moment of a subframe in a data frame in the M second data frames that are sent using the licensed carrier, the second communications device may determine a start moment of each subframe in the first data frame according to the first time offset, and detect each subframe in the first data frame on the unlicensed carrier according to the start moment. Optionally, each subframe in the first data frame may be detected on the unlicensed carrier according to the start moment and with reference to the subframe structure that is of the first data frame and is predefined by the system. Further, FIGS. 3A and 3B are still used as an example. It is assumed that the data frame A is the first data frame, and the data frame B is a data frame in the M second data frames. For example, the first time offset is used to indicate the time difference between the start moments of subframe n' and subframe n, then the second communications device may acquire the start moment of subframe n' according to the first time offset and the start moment of subframe n, and detect subframe n' on the unlicensed carrier according to the start moment. Similarly, if the first time offset is used to indicate the time difference between the start moments of subframe n+1' and subframe n+1 or the time difference between the start moments of subframe n+2' and subframe n+2 or the time difference between the start moments of subframe n+3' and subframe n+3 or the time difference between the start moments of subframe n+4' and subframe n+4, the second communications device may acquire the start moments of subframes n', n+1', n+2', n+3', and n+4' according to a same method in order to detect subframes n', n+1', n+2', n+3', and n+4' in sequence on the unlicensed carrier such that the entire data frame A can be detected.

It should be understood that, in this embodiment of the present disclosure, when the first time offset of the first data frame represents a time difference between a start moment of a subframe in the first data frame and a start moment of a subframe in a data frame in the M second data frames that are sent using the licensed carrier, the first information may include multiple first time offsets, that is, the first information includes a first time offset of each subframe in the first data frame. FIGS. 3A and 3B may still be used as an example. If it is assumed that the data frame A is the first data frame, and the data frame B is a data frame in the M second data frames, the first information may include 5 time offsets used to respectively indicate the start moments of subframes n', n+1', n+2', n+3', and n+4', or the first communications device may send multiple pieces of first information on the M second data frames, and each piece of first information includes a first time offset used to indicate a start moment of a subframe in the first data frame. For example, in FIGS. 3A and 3B, if it is assumed that the data frame A is the first data frame, and the data frame B is a data frame in the M second data frames, first information may be respectively carried in the subframes n, n+1, n+2, n+3, and n+4 of the data frame B, and respectively includes first time offsets that are used to represent time differences between start moments of subframes n', n+1', n+2', n+3', and n+4' and subframes n, n+1, n+2, n+3, and n+4, and the second communications device may determine the start moment of subframe n' according to the first time offset included in first information carried in subframe n, determine the start moment of subframe n+1' according to the first time offset included in first information carried in subframe n+1, and by analogy, determine the start moment of each subframe in the data frame A such that the data frame A can be detected on the unlicensed carrier according to the start moment.

(2) The first information includes only the second information used to trigger the detection of the first data frame on the unlicensed carrier.

Further, for example, after the first data frame is sent using the unlicensed carrier, the second information is sent using the licensed carrier, and the second communications device may detect a synchronization signal in a buffer and/or a currently received data frame according to the second information, acquire the start moment of the first data frame using the detected synchronization signal, and detect the first data frame in the buffer and/or the currently received data frame according to the start moment. Optionally, the second communications device may detect the first data frame according to the start moment and with reference to the frame structure or the subframe structure that is of the first data frame and is predefined by the system. That is, in this embodiment of the present disclosure, the first communications device does not notify the second communications device of related information about the start moment of the first data frame, and only instructs the second communications device to acquire, by detecting the synchronization signal, the start moment of the first data frame.

In case 2, the first information includes only information used to indicate the frame structure or the subframe structure of the first data frame.

Figure 11:
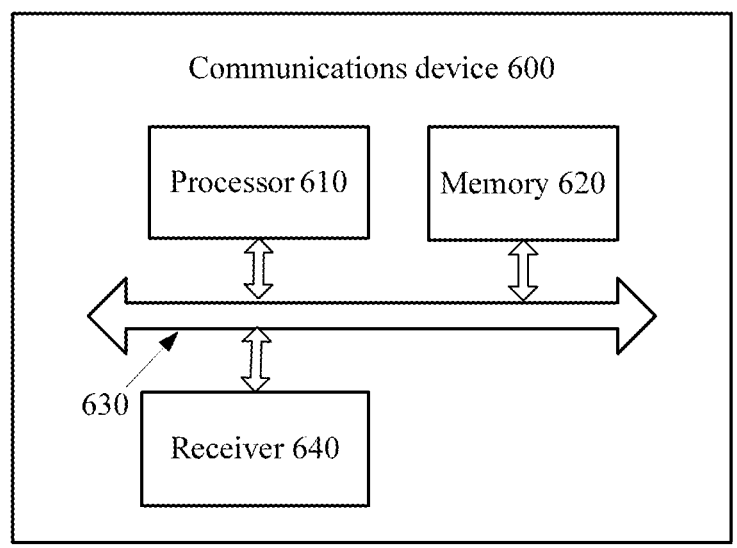
FIG. 11 shows a schematic block diagram of another communications device according to another embodiment of the present disclosure.

The information used to indicate the frame structure of the first data frame includes any information used to indicate the frame structure of the first data frame. For example, 111 may be used to represent the frame structure shown in FIG. 5A, 011 represents the frame structure shown in FIG. 5B, and 001 represents the frame structure shown in FIG. 5C. For example, when the first information includes 001, the second communications device may learn, according to 001, that the frame structure of the first data frame is the frame structure shown in FIG. 5C, and then may detect the first data frame in the buffer and/or the currently received data frame according to the frame structure shown in FIG. 5C. Optionally, the second communications device may determine the start moment of the first data frame by detecting the synchronization signal in the buffer and/or the currently received data frame, and then detect the first data frame in sequence in the buffer and/or the currently received data frame according to the start moment and the frame structure shown in FIG. 5C. It should be understood that a specific form or format of the information used to indicate the frame structure of the first data frame may be predefined by the system or mutually agreed on by the transmit end and the receive end, which is not limited in this embodiment of the present disclosure.

The information used to indicate the subframe structure of the first data frame includes any information used to indicate the subframe structure of the first data frame. For example, 01 may be used to represent a subframe only used to transmit data, for example, subframe structures of subframe 0 to subframe 8 in FIG. 5A, subframe 0 to subframe 3 in FIG. 5B, or subframe 0 in FIG. 5C, 11 represents a subframe that includes an idle state and is shown in a subframe structure of subframe 9 (referring to an enlarged figure) in FIG. 5A, and information 10 represents a subframe that includes a synchronization signal and is shown in a subframe structure of subframe 0 in FIG. 5A. For example, when the first information includes information 11, the second communications device may determine, according to 11, that a subframe structure of a to-be-detected subframe is the subframe structure of subframe 9 in FIG. 5A, and then may detect a corresponding subframe in the buffer and/or the currently data frame according to the subframe structure of subframe 9 in FIG. 5A. It should be understood that, when the first information includes the information used to indicate the subframe structure of the first data frame, during specific implementation, the first communications device needs to notify the second communications device of subframe structures of all subframes in the first data frame. Further, FIG. 3A is used as an example. If it is assumed that the data frame A is the first data frame, the data frame B is a data frame in the M second data frames, and the frame structure of the data frame A is shown in FIG. 5B, information 01 may be separately carried in subframes n, n+1, n+2, and n+3 of the data frame B, the information 11 is carried in subframe n+4, and the second communications device may detect subframes n', n+1', n+2', n+3', and n+4' in sequence on the unlicensed carrier according to the foregoing subframe structures.

It should be understood that, if a frame structure or a subframe structure of a data frame is different, information mapping made by the transmit end for this data frame is also different. Therefore, receiving of this data frame by the receive end is also different. Therefore, in this embodiment of the present disclosure, the second communications device may detect the first data frame on the unlicensed carrier according to the information that is used to indicate the frame structure of the first data frame and included in the first information or the information that is used to indicate the subframe structure of the first data frame and included in the first information.

In case 3, the first information includes either the first time offset of the first data frame or the second information, and includes the information used to indicate the frame structure of the first data frame or the information used to indicate the subframe structure of the first data frame.

In this case, the second communications device may determine the start moment of the first data frame according to the first time offset of the first data frame or the second information, determine the frame structure of the first data frame or the subframe structure of the first data frame according to the information used to indicate the frame structure of the first data frame or the information used to indicate the subframe structure of the first data frame, and then detect the first data frame on the unlicensed carrier according to the start moment of the first data frame and the frame structure of the first data frame or the subframe structure of the first data frame.

(1) When the first information includes the second information and the information that is used to indicate the frame structure of the first data frame, the second communications device acquires the start moment of the first data frame by detecting the synchronization signal according to the second information, and detects the first data frame on the unlicensed carrier with reference to the frame structure of the first data frame.

(2) When the first information includes a first time offset used to indicate a time difference between the start moment of the first data frame and a start moment of a data frame in the M second data frames and information used to indicate the frame structure of the first data frame, the second communications device determines a start sending moment of the first data frame according to the first time offset, and detects the first data frame on the unlicensed carrier according to the start sending moment and frame structure information of the first data frame.

Further, FIGS. 3A and 3B are used as an example. The transmit end (the first communications device) sends the data frame A on the unlicensed carrier f1, and the frame structure and the subframe structure of the data frame A are shown in FIG. 5B. The data frame B is sent on the licensed carrier f2, and each subframe in the data frame B carries first information, where the first information not only includes a first time offset used to indicate a time difference between a start moment of a subframe in the data frame A and a start moment of a subframe in the data frame B, but also includes information used to indicate the subframe structure of the data frame A. Further, the first information carried in subframe n includes 01 (assuming that the system predefines that 01 represents a subframe only used to transmit data) and a first time offset used to indicate the time difference between the start moments of subframe n and subframe n'. The first information carried in subframe n+1 includes 01 and a first time offset used to indicate the time difference between the start moments of subframe n+1 and subframe n+1'. First information carried in subframe n+2 includes 01 and a first time offset used to indicate the time difference between the start moments of subframe n+2 and subframe n+2'. First information carried in subframe n+3 includes 01 and a first time offset used to indicate the start moments of subframe n+3 and subframe n+3'. First information carried in subframe n+4 includes 11 (assuming that the system predefines that "11" represents a subframe that includes an idle state) and a first time offset used to indicate the time difference between the start moments of subframe n+4 and subframe n+4'. Accordingly, the receive end (the second communications device) may separately determine a start moment of each subframe in the first data frame and a subframe format of each subframe according to the first information received from subframes n, n+1, n+2, n+3, and n+4 such that the first data frame can be detected in sequence on the unlicensed carrier.

For an unlicensed carrier, the system occupies a channel in a competition manner, and the system cannot occupy the channel all the time to transmit data. Therefore, on the unlicensed carrier, a moment at which data is sent varies with a moment at which the channel is successfully occupied by competition, and an original behavior that is of a receiver and for a licensed carrier is no longer applicable. In a traditional communications system, such as WiFi, that uses an unlicensed carrier, a signal receiver needs to continuously monitor a channel, acquires a frame header by continuously detecting a synchronization signal, and then performs a series of subsequent processing. A biggest problem of this method is heavy power consumption of a device, which affects standby time of the device. For the foregoing existent problem, the transmission method in this embodiment of the present disclosure can avoid that the receive end continuously monitors a channel of an unlicensed carrier, and can reduce energy consumption of the receive end.

Therefore, according to the transmission method in this embodiment of the present disclosure, information required for detecting a first data frame by a receive end is sent using a licensed carrier such that the receive end can effectively detect the first data frame on an unlicensed carrier according to the information, which can effectively improve efficiency of signal transmission on the unlicensed carrier, and can reduce energy consumption of the receive end.

Optionally, in an embodiment, in the transmission method 100 shown in FIG. 1, when the first data frame is sent or after the first data frame is sent, the sending M second data frames to the second communications device using a licensed carrier includes sending the M second data frames to the second communications device using the licensed carrier when the first time offset of the first data frame changes compared with a third time offset of a third data frame, or the frame structure of the first data frame changes compared with a frame structure of the third data frame, or the subframe structure of the first data frame changes compared with a subframe structure of the third data frame, where the third data frame is a data frame that is sent using the unlicensed carrier, the third data frame is a previous data frame of the first data frame, the third time offset represents a time difference between a start moment of the third data frame and a start moment of a fourth data frame, or the third time offset represents a time difference between a start moment of a subframe in the third data frame and a start moment of a subframe in the fourth data frame, the fourth data frame is a data frame that is sent using the licensed carrier, and the fourth data frame is a data frame before the M second data frames.

Further, for example, the first communications device obtains a resource on the unlicensed carrier by competition, and then sends the third data frame to the second communications device using the unlicensed carrier. After the third data frame, the first communications device determines that the resource on the unlicensed carrier is still occupied, may send the first data frame immediately after the third data frame using the unlicensed carrier. If the first data frame and the third data frame have same properties, that is, both frame structures and subframe structures are the same, and the first data frame is sent immediately after the third data frame, the first communications device may send, to the second communications device without using the licensed carrier, the information required for detecting the first data frame by the second communications device, because the second communications device can continue to receive the first data frame according to a receiving mechanism of the third data frame. However, if the frame structure or the subframe structure of the first data frame changes relative to that of the third data frame, or the first data frame is not sent immediately after the third data frame, in this case, the information required for detecting the first data frame by the second communications device needs to be sent to the second communications device using the licensed carrier.

Optionally, in an embodiment, in the method 100 shown in FIG. 1, the third time offset includes at least one type of the following information, an absolute time difference, a quantity of collection points, and a quantity of symbols.

Therefore, according to the transmission method in this embodiment of the present disclosure, information required for detecting a first data frame by a receive end (a second communications device) is sent using a licensed carrier such that the receive end can effectively detect the first data frame on an unlicensed carrier according to the information, which can effectively improve efficiency of signal transmission on the unlicensed carrier, and can reduce energy consumption of the receive end.

It should be understood that the M second data frames are sent to the second communications device using the licensed carrier, and at least one data frame in the M second data frames carries the first information. Optionally, the first information may be sent to the second communications device using a physical downlink control channel (PDCCH) or an enhanced physical downlink control channel (EPDCCH) or a radio resource control (RRC) protocol. It should also be understood that, in this embodiment of the present disclosure, the first information may be sent using control signaling, or sent using another form of message or signaling, which is not limited in this embodiment of the present disclosure.

It should also be understood that devices that are authorized to use an unlicensed carrier may be classified into two types. The first type is frame based equipment (FBE), and the second type is load based equipment (LBE). Optionally, a technical solution in this embodiment of the present disclosure may be executed by the FBE and/or the LBE.

In the foregoing, the transmission method 100 according to this embodiment of the present disclosure is described in detail from a perspective of a transmit end (a first communications device) with reference to FIGS. 1, 2A, 2B, 2C, 3A, 3B, 4, 5A, 5B, 5C, 6A, and 6B, and in the following, a transmission method 200 according to an embodiment of the present disclosure is described from a perspective of a receive end (a second communications device) with reference to FIG. 7.

As shown in FIG. 7, for example, the transmission method 200 according to this embodiment of the present disclosure may be executed by the second communications device, where the second communications device may be a user equipment, may be a base station, or may be one chip or multiple chips. As shown in FIG. 7, the transmission method 200 includes the following steps.

Step S210: Receive M second data frames that are sent by the first communications device using a licensed carrier, where at least one data frame in the M second data frames carries first information, the first information includes information required for detecting a first data frame that is sent by the first communications device using an unlicensed carrier, and M is an integer not less than 1.

Step S220: Start to detect the first data frame according to the first information when or after the first information is obtained.

Therefore, according to the transmission method in this embodiment of the present disclosure, information required for detecting a first data frame that is sent by the transmit end (the first communications device) using an unlicensed carrier is sent using a licensed carrier such that the receive end (the second communications device) can effectively detect the first data frame according to the information, which can effectively improve efficiency of signal transmission on the unlicensed carrier, and can reduce energy consumption of the receive end.

Optionally, in an embodiment, in the transmission method 200 shown in FIG. 7, the first information includes information used to indicate a frame structure of the first data frame or information used to indicate a subframe structure of the first data frame.

Further, when the first communications device sends the M second data frames before sending the first data frame (as shown in FIG. 2A), the first information includes the information used to indicate the frame structure of the first data frame or the information used to indicate the subframe structure of the first data frame. For specific descriptions, refer to the foregoing corresponding descriptions. Details are not described herein again for brevity.

Optionally, in an embodiment, in the transmission method 200 shown in FIG. 7, the first information includes at least one of the following a first time offset of the first data frame, information used to indicate a frame structure of the first data frame, information used to indicate a subframe structure of the first data frame, or second information used to trigger detection of the first data frame on the unlicensed carrier.

Further, when the first communications device sends the M second data frames when sending the first data frame or after sending the first data frame (as shown in FIG. 2A and FIG. 2B), the first information includes at least one of the first time offset of the first data frame, the information used to indicate the frame structure of the first data frame, the information used to indicate the subframe structure of the first data frame, or the second information used to trigger the detection of the first data frame on the unlicensed carrier. For specific descriptions, refer to the foregoing corresponding descriptions. Details are not described herein again for brevity.

Optionally, in an embodiment, in the transmission method 200 shown in FIG. 7, the first information includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

For details, refer to FIGS. 3A and 3B. For specific descriptions, refer to the foregoing corresponding descriptions. Details are not described herein again for brevity.

Optionally, in an embodiment, in the transmission method 200 shown in FIG. 7, the first time offset includes at least one type of the following information, an absolute time difference, a quantity of collection points, and a quantity of symbols.

Further, in this embodiment of the present disclosure, a symbol may be a unit of time. For example, one symbol may represent ($1/12$) ms. When one data frame includes 5 subframes and each subframe includes 12 symbols, each subframe in the data frame is 1 ms and a frame period of the data frame is 5 ms.

Optionally, in an embodiment, in the transmission method 200 shown in FIG. 7, the first information includes the second information.

The starting to detect the first data frame according to the first information includes starting to detect a synchronization signal according to the second information, and determining the start moment of the first data frame when or after the second information is obtained, and detecting the first data frame according to the start moment.

Further, for example, after the first data frame is sent using the unlicensed carrier, the second information is sent using the licensed carrier, and the second communications device detects the synchronization signal in a buffer and/or a currently received data frame according to the second information, acquires the start moment of the first data frame using the detected synchronization signal, and detects the first data frame in the buffer and/or the currently received data frame according to the start moment. Optionally, the second communications device may detect the first data frame according to the start moment and with reference to the frame structure or the subframe structure that is of the first data frame and is predefined by a system. That is, in this embodiment of the present disclosure, the first communications device does not notify the second communications device of related information about the start moment of the first data frame, and only instructs the second communications device to acquire, by detecting the synchronization signal, the start moment of the first data frame.

Optionally, in an embodiment, in the transmission method 200 shown in FIG. 7, the frame structure of the first data frame is as follows.

A frame period of the first data frame includes a channel occupancy period and a channel idle period, and the channel idle period is at least 5% of the channel occupancy period.

For details, refer to FIG. 4. For specific descriptions, refer to the foregoing corresponding descriptions. Details are not described herein again for brevity.

Optionally, in an embodiment, in the transmission method 200 shown in FIG. 7, the frame structure of the first data frame is as follows.

The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

For details, refer to FIGS. 4, 5A, 5B, and 5C. For specific descriptions, refer to the foregoing corresponding descriptions. Details are not described herein again for brevity.

Optionally, in an embodiment, in the transmission method 200 shown in FIG. 7, the subframe structure of the first data frame is as follows.

A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

For details, refer to FIGS. 5A, 5B, 5C, 6A, and 6B. For specific descriptions, refer to the foregoing corresponding descriptions. Details are not described herein again for brevity.

Therefore, according to the transmission method in this embodiment of the present disclosure, information required for detecting a first data frame that is sent by a transmit end (a first communications device) using an unlicensed carrier is sent using a licensed carrier such that a receive end (a second communications device) can effectively detect the first data frame according to the information, which can effectively improve efficiency of signal transmission on the unlicensed carrier, and can reduce energy consumption of the receive end.

In this embodiment of the present disclosure, in step S220, starts to detect the first data frame according to the first information when or after the first information is obtained, where the first information includes at least one type of information of the following information, the first time offset of the first data frame, the information used to indicate the frame structure of the first data frame, the information used to indicate the subframe structure of the first data frame, and the second information used to trigger the detection of the first data frame on the unlicensed carrier. Further, the first information may include any of the foregoing four types of information, or may include multiple types of the foregoing four types of information. Accordingly, the second communications device may detect the first data frame on the unlicensed carrier according to different combinations that are of the foregoing information and are included in the first information. For detailed descriptions, refer to the foregoing corresponding descriptions. Details are not described herein again for brevity.

It should be understood that the M second data frames that are sent by the first communications device using the licensed carrier is received, and at least one data frame in the M second data frames carries the first information. Optionally, the first information may be received using a PDCCH or an EPDCCH or an RRC protocol, which is not limited in this embodiment of the present disclosure.

It should also be understood that devices that are authorized to use an unlicensed carrier may be classified into two types. The first type is FBE, and the second type is LBE. Optionally, a technical solution in this embodiment of the present disclosure may be executed by the FBE and/or the LBE.

In the foregoing, transmission methods according to embodiments of the present disclosure are described in detail with reference to FIG. 1 to FIG. 7, and in the following, a communications device according to an embodiment of the present disclosure is described in detail with reference to FIG. 8 to FIG. 11.

Figure 8:
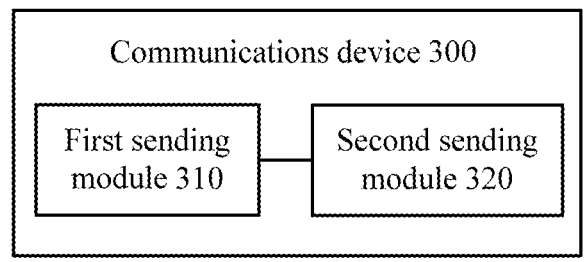
FIG. 8 shows a schematic block diagram of a communications device according to an embodiment of the present disclosure.

FIG. 8 shows a schematic block diagram of a communications device 300 according to an embodiment of the present disclosure. As shown in FIG. 8, the communications device 300 includes a first sending module 310 configured to send a first data frame to a second communications device using an unlicensed carrier, and a second sending module 320 configured to send M second data frames to the second communications device using a licensed carrier, where at least one data frame in the M second data frames carries first information, the first information includes information required for detecting the first data frame by the second communications device, and M is an integer not less than 1.

Therefore, according to the communications device in this embodiment of the present disclosure, information required for detecting a first data frame by a receive end (a second communications device) is sent using a licensed carrier such that the receive end can effectively detect the first data frame on an unlicensed carrier according to the information, which can effectively improve efficiency of signal transmission on the unlicensed carrier, and can reduce energy consumption of the receive end.

Optionally, in an embodiment, in the communications device 300 shown in FIG. 8, the communications device 300 further includes a first determining module (not shown) configured to determine whether the first sending module 310 has sent the first data frame, and the first information sent by the second sending module 320 includes information used to indicate a frame structure of the first data frame or information used to indicate a subframe structure of the first data frame when the first determining module determines that the first sending module 310 has not sent the first data frame.

Optionally, in an embodiment, in the communications device 300 shown in FIG. 8, the second sending module 320 is further configured to send the M second data frames to the second communications device using the licensed carrier when the first determining module determines that the first sending module 310 has not sent the first data frame, where the first information includes the information used to indicate the frame structure of the first data frame or the information used to indicate the subframe structure of the first data frame.

Optionally, in an embodiment, in the communications device 300 shown in FIG. 8, the communications device 300 further includes a first determining module (not shown) configured to determine whether the first sending module has sent the first data frame, and when the first determining module determines that the first sending module 310 is sending the first data frame, or the first sending module 310 has sent the first data frame, the first information sent by the second sending module 320 includes at least one of a first time offset of the first data frame, information used to indicate a frame structure of the first data frame, information used to indicate a subframe structure of the first data frame, or second information used to trigger the second communications device to detect, using the unlicensed carrier, the first data frame.

Optionally, in an embodiment, in the communications device 300 shown in FIG. 8, the first information includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

Optionally, in an embodiment, in the communications device 300 shown in FIG. 8, the first time offset includes at least one type of the following information, an absolute time difference, a quantity of collection points, and a quantity of symbols.

Optionally, in an embodiment, in the communications device 300 shown in FIG. 8, the communications device 300 further includes a second determining module (not shown) configured to determine, whether the first time offset of the first data frame changes compared with a third time offset of a third data frame, or whether the frame structure of the first data frame changes compared with a frame structure of the third data frame, or whether the subframe structure of the first data frame changes compared with a subframe structure of the third data frame, and a triggering module configured to trigger the second sending module 320 to send the M second data frames when the second determining module determines that, the first time offset of the first data frame changes compared with the third time offset, or the frame structure of the first data frame changes compared with the frame structure of the third data frame, or the subframe structure of the first data frame changes compared with the subframe structure of the third data frame, where the third data frame is a data frame that is sent using the unlicensed carrier, the third data frame is a previous data frame of the first data frame, the third time offset represents a time difference between a start moment of the third data frame and a start moment of a fourth data frame, or the third time offset represents a time difference between a start moment of a subframe in the third data frame and a start moment of a subframe in the fourth data frame, the fourth data frame is a data frame that is sent using the licensed carrier, and the fourth data frame is a data frame before the M second data frames.

Optionally, in an embodiment, in the communications device 300 shown in FIG. 8, the third time offset includes at least one type of the following information, an absolute time difference, a quantity of collection points, and a quantity of symbols.

Optionally, in an embodiment, in the communications device 300 shown in FIG. 8, the subframe structure of the first data frame sent by the first sending module 310 is as follows.

A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

Optionally, in an embodiment, in the communications device 300 shown in FIG. 8, the frame structure of the first data frame sent by the first sending module 310 is as follows. A frame period of the first data frame includes a channel occupancy period and a channel idle period, and the channel idle period is at least 5% of the channel occupancy period.

Optionally, in an embodiment, in the communications device 300 shown in FIG. 8, the frame structure of the first data frame sent by the first sending module 310 is as follows. The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

It should be understood that the communications device 300 according to this embodiment of the present disclosure may be corresponding to a first communications device in a transmission method in an embodiment of the present disclosure, and the foregoing and other operations and/or functions of the modules of the communications device 300 are separately used to implement corresponding procedures of methods in FIG. 1 to FIG. 7, and are not described herein again for brevity.

Therefore, according to the communications device in this embodiment of the present disclosure, information required for detecting a first data frame by a receive end (a second communications device) is sent using a licensed carrier such that the receive end can effectively detect the first data frame on an unlicensed carrier according to the information, which can effectively improve efficiency of signal transmission on the unlicensed carrier, and can reduce energy consumption of the receive end.

In the foregoing, the communications device 300 that is used as a transmit end according to this embodiment of the present disclosure is described in detail with reference to FIG. 8, and in the following, a communications device 400 that is used as a receive end according to an embodiment of the present disclosure is described in detail with reference to FIG. 9.

Figure 9:
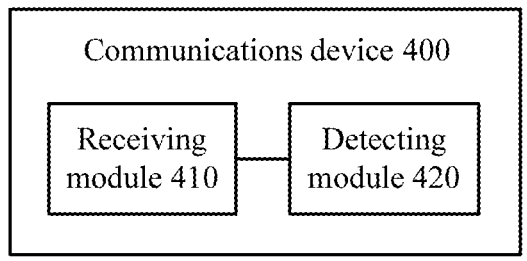
FIG. 9 shows a schematic block diagram of another communications device according to an embodiment of the present disclosure.

FIG. 9 shows a schematic block diagram of the communications device 400 according to this embodiment of the present disclosure. As shown in FIG. 9, the communications device 400 includes a receiving module 410 configured to receive M second data frames that are sent by a first communications device using a licensed carrier, where at least one data frame in the M second data frames carries first information, the first information includes information required for detecting a first data frame that is sent by the first communications device using an unlicensed carrier, and M is an integer not less than 1, and a detecting module 420 configured to start to detect the first data frame according to the first information received by the receiving module 410 when or after the first information is obtained.

Therefore, according to the communications device in this embodiment of the present disclosure, information required for detecting a first data frame by a receive end (a communications device 400) is sent using a licensed carrier such that the receive end can effectively detect the first data frame on an unlicensed carrier according to the information, which can effectively improve efficiency of signal transmission on the unlicensed carrier, and can reduce energy consumption of the receive end.

Optionally, in an embodiment, in the communications device 400 shown in FIG. 9, the first information received by the receiving module 410 includes information used to indicate a frame structure of the first data frame or information used to indicate a subframe structure of the first data frame.

Optionally, in an embodiment, in the communications device 400 shown in FIG. 9, the first information received by the receiving module 410 includes at least one of a first time offset of the first data frame, information used to indicate a frame structure of the first data frame, the information used to indicate a subframe structure of the first data frame, or second information used to trigger detection of the first data frame on the unlicensed carrier.

Optionally, in an embodiment, in the communications device 400 shown in FIG. 9, the first information received by the receiving module 410 includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

Optionally, in an embodiment, in the communications device 400 shown in FIG. 9, the first time offset includes at least one type of the following information, an absolute time difference, a quantity of collection points, and a quantity of symbols.

Optionally, in an embodiment, in the communications device 400 shown in FIG. 9, the first information received by the receiving module 410 includes the second information.

The detecting module 420 includes a first detecting unit (not shown) configured to start to detect a synchronization signal according to the second information, and determine the start moment of the first data frame when or after the second information is obtained, and a second detecting unit (not shown) configured to detect the first data frame using the unlicensed carrier according to the start moment determined by the first detecting unit.

Optionally, in an embodiment, in the communications device 400 shown in FIG. 9, the frame structure of the first data frame detected by the detecting module 420 is as follows. A frame period of the first data frame includes a channel occupancy period and a channel idle period, and the channel idle period is at least 5% of the channel occupancy period.

Optionally, in an embodiment, in the communications device 400 shown in FIG. 9, the frame structure of the first data frame detected by the detecting module 420 is as follows.

The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

Optionally, in an embodiment, in the communications device 400 shown in FIG. 9, the subframe structure of the first data frame detected by the detecting module 420 is as follows.

A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

It should be understood that the communications device 400 according to this embodiment of the present disclosure may be corresponding to a second communications device in a transmission method in an embodiment of the present disclosure, and the foregoing and other operations and/or functions of the modules of the communications device 400 are separately used to implement corresponding procedures of methods in FIG. 1 to FIG. 7, and are not described herein again for brevity.

Therefore, according to the communications device in this embodiment of the present disclosure, information required for detecting a first data frame by a receive end (a communications device 400) is sent using a licensed carrier such that the receive end can effectively detect the first data frame on an unlicensed carrier according to the information, which can effectively improve efficiency of signal transmission on the unlicensed carrier, and can reduce energy consumption of the receive end.

Figure 10:
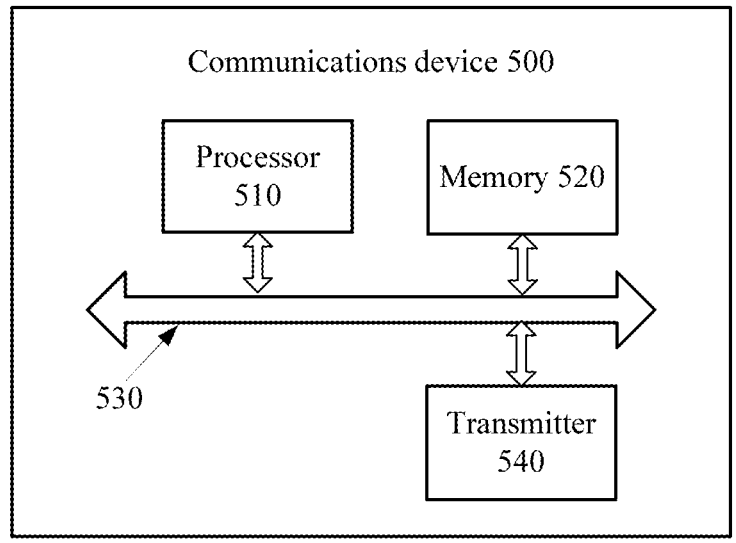
FIG. 10 shows a schematic block diagram of a communications device according to another embodiment of the present disclosure.

As shown in FIG. 10, an embodiment of the present disclosure further provides a communications device 500, and the communications device 500 includes a processor 510, a memory 520, a bus system 530, and a transmitter 540. The processor 510, the memory 520, and the transmitter 540 are connected to each other using the bus system 530, the memory 520 is configured to store an instruction, and the processor 510 is configured to execute the instruction stored by the memory 520 in order to control the transmitter 540 to send a signal. The transmitter 540 is configured to send a first data frame to a second communications device using an unlicensed carrier, and the transmitter 540 is further configured to send M second data frames to the second communications device using a licensed carrier, where at least one data frame in the M second data frames carries first information, the first information includes information required for detecting the first data frame by the second communications device, and M is an integer not less than 1.

Therefore, according to the communications device in this embodiment of the present disclosure, information required for detecting a first data frame by a receive end (a second communications device) is sent using a licensed carrier such that the receive end can effectively detect the first data frame on an unlicensed carrier according to the information, which can effectively improve efficiency of signal transmission on the unlicensed carrier, and can reduce energy consumption of the receive end.

Optionally, in an embodiment, the processor 510 is configured to determine whether the unlicensed carrier is occupied, and the transmitter 540 is further configured to send the first data frame to the second communications device using the unlicensed carrier when the processor 510 determines the unlicensed carrier is occupied.

Optionally, in an embodiment, the processor 510 is configured to determine whether the transmitter 540 has sent the first data frame, and when the processor 510 determines that the first data frame has not been sent, the first information carried in the at least one data frame in the M second data frames that are sent by the transmitter 540 includes information used to indicate a frame structure of the first data frame or information used to indicate a subframe structure of the first data frame.

Optionally, in an embodiment, the processor 510 is configured to determine whether the transmitter 540 has sent the first data frame, and when the processor 510 determines that the transmitter 540 is sending the first data frame or has sent the first data frame, the first information carried in the at least one data frame in the M second data frames that are sent by the transmitter 540 includes at least one of the following a first time offset of the first data frame, information used to indicate a frame structure of the first data frame, information used to indicate a subframe structure of the first data frame, or second information used to trigger the second communications device to detect the first data frame on the unlicensed carrier.

Optionally, in an embodiment, the first information carried in the at least one data frame in the M second data frames that are sent by the transmitter 540 includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

Optionally, in an embodiment, the first time offset includes at least one type of the following information, an absolute time difference, a quantity of collection points, and a quantity of symbols.

Optionally, in an embodiment, the processor 510 is configured to determine, whether the first time offset of the first data frame changes compared with a third time offset of a third data frame, or whether the frame structure of the first data frame changes compared with a frame structure of the third data frame, or whether the subframe structure of the first data frame changes compared with a subframe structure of the third data frame.

The processor 510 is further configured to trigger the transmitter 540 to send the M second data frames when the first time offset of the first data frame changes compared with the third time offset of the third data frame, or the frame structure of the first data frame changes compared with the frame structure of the third data frame, or the subframe structure of the first data frame changes compared with the subframe structure of the third data frame, where the third data frame is a data frame that is sent using the unlicensed carrier, the third data frame is a previous data frame of the first data frame, the third time offset represents a time difference between a start moment of the third data frame and a start moment of a fourth data frame, or the third time offset represents a time difference between a start moment of a subframe in the third data frame and a start moment of a subframe in the fourth data frame, the fourth data frame is a data frame that is sent using the licensed carrier, and the fourth data frame is a data frame before the M second data frames.

Optionally, in an embodiment, the third time offset includes at least one type of the following information, an absolute time difference, a quantity of collection points, and a quantity of symbols.

Optionally, in an embodiment, the subframe structure of the first data frame sent by the transmitter 540 is as follows.

A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 8 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

Optionally, in an embodiment, the frame structure of the first data frame sent by the transmitter 540 is as follows. A frame period of the first data frame includes a channel occupancy period and a channel idle period, and the channel idle period is at least 5% of the channel occupancy period.

Optionally, in an embodiment, the frame structure of the first data frame sent by the transmitter 540 is as follows. The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 28 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

It should be understood that, in this embodiment of the present disclosure, the processor 510 may be a central processing unit (CPU), or the processor 510 may be another general-purpose processor, a digital signal processor (DSP), an application-specific integrated circuit (ASIC), a field programmable gate array (FPGA), another programmable logic device, a discrete gate or transistor logic device, a discrete hardware assembly, or the like. The general-purpose processor may be a microprocessor, or the processor may be any conventional processor, and so on.

The memory 520 may include a read-only memory (ROM) and a random access memory (RAM), and provides an instruction and data for the processor 510. A part of the memory 520 may further include a nonvolatile RAM. For example, the memory 520 may further store information about a device type.

In addition to a data bus, the bus system 530 may further include a power bus, a control bus, a status signal bus, and the like. However, for clarity of description, various buses are marked as the bus system 530 in the figure.

In an implementation process, the steps in the foregoing methods may be completed using an integrated logic circuit of hardware in the processor 510 or an instruction in a form of software. Steps of the methods disclosed with reference to the embodiments of the present disclosure may be directly executed and completed using a hardware processor, or executed and completed using a combination of hardware and software modules in the processor. A software module may be located in a mature storage medium in the art, such as a random access memory, a flash memory, a read-only memory, a programmable read-only memory, an electrically-erasable programmable memory, or a register. The storage medium is located in the memory 520. The processor 510 reads information from the memory 520, and completes the steps of the foregoing methods in combination with the hardware. To avoid repetition, details are not described herein again.

It should be understood that the communications device 500 according to this embodiment of the present disclosure may be corresponding to a first communications device in a transmission method in an embodiment of the present disclosure, and may also be corresponding to a communications device 300 in an embodiment of the present disclosure, and the foregoing and other operations and/or functions of the modules of the communications device 500 are separately used to implement corresponding procedures of methods in FIG. 1 to FIG. 7, and are not described herein again for brevity.

In addition, a computer readable medium is further provided, including a computer readable instruction that performs the following operation when the medium is executed. Executing the operations from step S110 to step S120 in the method of the foregoing embodiments.

In addition, a computer program product is further provided, including the foregoing computer readable medium.

Therefore, according to the communications device in this embodiment of the present disclosure, information required for detecting a first data frame by a receive end (a second communications device) is sent using a licensed carrier such that the receive end can effectively detect the first data frame on an unlicensed carrier according to the information, which can effectively improve efficiency of signal transmission on the unlicensed carrier, and can reduce energy consumption of the receive end.

As shown in FIG. 11, an embodiment of the present disclosure further provides a communications device 600, and the communications device 600 includes a processor 610, a memory 620, a bus system 630, and a receiver 640. The processor 610, the memory 620, and the receiver 640 are connected to each other using the bus system 630, the memory 620 is configured to store an instruction, and the processor 610 is configured to execute the instruction stored by the memory 620 in order to control the receiver 640 to receive a signal. The receiver 640 is configured to receive M second data frames that are sent by a first communications device using a licensed carrier, where at least one data frame in the M second data frames carries first information, the first information includes information required for detecting a first data frame that is sent by the first communications device using an unlicensed carrier, and M is an integer not less than 1. The processor 610 is configured to start to detect the first data frame according to the first information when or after the first information is obtained.

Therefore, according to the communications device in this embodiment of the present disclosure, information required for detecting a first data frame by a receive end (a communications device 600) is sent using a licensed carrier such that the receive end can effectively detect the first data frame on an unlicensed carrier according to the information, which can effectively improve efficiency of signal transmission on the unlicensed carrier, and can reduce energy consumption of the receive end.

Optionally, in an embodiment, the first information received by the receiver 640 includes information used to indicate a frame structure of the first data frame or information used to indicate a subframe structure of the first data frame.

Optionally, in an embodiment, the first information received by the receiver 640 includes at least one of a first time offset of the first data frame, information used to indicate a frame structure of the first data frame, information used to indicate a subframe structure of the first data frame, or second information used to trigger detection of the first data frame on the unlicensed carrier.

Optionally, in an embodiment, the first information received by the receiver 640 includes the first time offset of the first data frame, and the first time offset represents a time difference between a start moment of the first data frame and a start moment of a data frame in the M second data frames, or the first time offset represents a time difference between a start moment of a subframe in the first data frame and a start moment of a subframe in a data frame in the M second data frames.

Optionally, in an embodiment, the first time offset includes at least one type of the following information, an absolute time difference, a quantity of collection points, and a quantity of symbols.

Optionally, in an embodiment, the first information received by the receiver 640 includes the second information, and the processor 610 is further configured to start to detect a synchronization signal according to the second information, and determine the start moment of the first data frame when or after the second information is obtained, and detect the first data frame according to the start moment of the first data frame.

Optionally, in an embodiment, the frame structure of the first data frame detected by the processor 610 is as follows.

A frame period of the first data frame includes a channel occupancy period and a channel idle period, and the channel idle period is at least 5% of the channel occupancy period.

Optionally, in an embodiment, the frame structure of the first data frame detected by the processor 610 is as follows.

The frame period of the first data frame includes 140 symbols, where the channel occupancy period includes 133 symbols, and the channel idle period includes 7 symbols, or the frame period of the first data frame includes 70 symbols, where the channel occupancy period includes 66 symbols, and the channel idle period includes 4 symbols, or the frame period of the first data frame includes 26 symbols, where the channel occupancy period includes 26 symbols, and the channel idle period includes 2 symbols, or the frame period of the first data frame includes 120 symbols, where the channel occupancy period includes 114 symbols, and the channel idle period includes 6 symbols, or the frame period of the first data frame includes 60 symbols, where the channel occupancy period includes 56 symbols, and the channel idle period includes 4 symbols, or the frame period of the first data frame includes 24 symbols, where the channel occupancy period includes 22 symbols, and the channel idle period includes 2 symbols.

Optionally, in an embodiment, the subframe structure of the first data frame detected by the processor 610 is as follows.

A period of a subframe in the first data frame includes 14 symbols, where 7 symbols are used to transmit data, and 7 symbols are idle, or a period of a subframe in the first data frame includes 14 symbols, where 10 symbols are used to transmit data, and 4 symbols are idle, or a period of a subframe in the first data frame includes 14 symbols, where 12 symbols are used to transmit data, and 2 symbols are idle, or a period of a subframe in the first data frame includes 14 symbols, where 14 symbols are used to transmit data, or a period of a subframe in the first data frame includes 14 symbols, where 1 symbol is used to transmit a synchronization signal, or a period of a subframe in the first data frame includes 14 symbols, where 2 symbols are used to transmit a synchronization signal, or a period of a subframe in the first data frame includes 12 symbols, where 6 symbols are used to transmit data, and 6 symbols are idle, or a period of a subframe in the first data frame includes 12 symbols, where 6 symbols are used to transmit data, and 4 symbols are idle, or a period of a subframe in the first data frame includes 12 symbols, where 10 symbols are used to transmit data, and 2 symbols are idle, or a period of a subframe in the first data frame includes 12 symbols, where 12 symbols are used to transmit data, or a period of a subframe in the first data frame includes 12 symbols, where 1 symbol is used to transmit a synchronization signal, or a period of a subframe in the first data frame includes 12 symbols, where 2 symbols are used to transmit a synchronization signal.

It should be understood that, in this embodiment of the present disclosure, the processor 610 may be a CPU, and the processor 610 may also be another general-purpose processor, a DSP, an ASIC, an FPGA, another programmable logic device, a discrete gate or transistor logic device, a discrete hardware assembly, or the like. The general-purpose processor may be a microprocessor, or the processor may also be any conventional processor, and so on.

The memory 620 may include a ROM and a RAM, and provides an instruction and data for the processor 610. A part of the memory 620 may further include a nonvolatile RAM. For example, the memory 620 may further store information about a device type.

In addition to a data bus, the bus system 630 may further include a power bus, a control bus, a status signal bus, and the like. However, for clarity of description, various buses are marked as the bus system 630 in the figure.

In an implementation process, the steps in the foregoing methods may be completed using an integrated logic circuit of hardware in the processor 610 or an instruction in a form of software. Steps of the methods disclosed with reference to the embodiments of the present disclosure may be directly executed and completed using a hardware processor, or executed and completed using a combination of hardware and software modules in the processor. A software module may be located in a mature storage medium in the art, such as a RAM, a flash memory, a ROM, a programmable ROM, an electrically-erasable programmable memory, or a register. The storage medium is located in the memory 620. The processor 610 reads information from the memory 620, and completes the steps of the foregoing methods in combination with the hardware. To avoid repetition, details are not described herein again.

It should be understood that the communications device 600 according to this embodiment of the present disclosure may be corresponding to a second communications device in a transmission method in an embodiment of the present disclosure, and may also be corresponding to a communications device 400 in an embodiment of the present disclosure, and the foregoing and other operations and/or functions of the modules of the communications device 600 are separately used to implement corresponding procedures of methods in FIG. 1 to FIG. 7, and are not described herein again for brevity.

In addition, a computer readable medium is further provided, including a computer readable instruction that performs the following operation when the medium is executed. Executing the operations from step S210 to step S220 in the method of the foregoing embodiments.

In addition, a computer program product is further provided, including the foregoing computer readable medium.

Therefore, according to the communications device in this embodiment of the present disclosure, information required for detecting a first data frame by a receive end (a communications device 600) is sent using a licensed carrier such that the receive end can effectively detect the first data frame on an unlicensed carrier according to the information, which can effectively improve efficiency of signal transmission on the unlicensed carrier, and can reduce energy consumption of the receive end.

It should be understood that the term "and/or" in this specification describes only an association relationship for describing associated objects and represents that three relationships may exist. For example, A and/or B may represent the following three cases. Only A exists, both A and B exist, and only B exists. In addition, the character "/" in this specification generally represents an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A transmission method, comprising:
   sending a first data frame to a second communications device using an unlicensed carrier; and
   sending M second data frames to the second communications device using a licensed carrier, wherein at least one data frame in the M second data frames carries first information, wherein the first information comprises information required for detecting the first data frame by the second communications device, and wherein M is an integer not less than 1.

2. The method according to claim 1, wherein before the first data flame is sent, and when the M second data frames are sent to the second communications device using the licensed carrier, the first information comprises information used to indicate a frame structure of the first data frame or information used to indicate a subframe structure of the first data frame.

3. The method according to claim 1, wherein the first information comprises at least one of a first time offset of the first data frame, information used to indicate a frame structure of the first data frame, information used to indicate a subframe structure of the first data frame, and second information used to trigger the second communications device to detect the first data frame on the unlicensed carrier when the first data frame is sent or after the first data frame is sent, and when the M second data frames are sent to the second communications device using the licensed carrier.

4. The method according to claim 3, wherein the first information comprises the first time offset of the first data frame, and wherein the first time offset represents:
   a time difference between a start moment of the first data frame and a start moment of a data frame in the M second data frames; or
   a time difference between a start moment of a subframe in the first data frame and a start moment of a subframe in a data frame in the M second data frames.

5. The method according to claim 4, wherein the first time offset comprises at least one of an absolute time difference, a quantity of collection points, and a quantity of symbols.

6. The method according to claim 2, wherein the subframe structure of the first data frame comprises:
   a period of a subframe in the first data frame comprises 14 symbols, wherein 7 symbols are used to transmit data, and wherein 7 symbols are idle; or
   the period of the subframe in the first data frame comprises 14 symbols, wherein 10 symbols are used to transmit the data, and wherein 4 symbols are idle; or
   the period of the subframe in the first data frame comprises 14 symbols, wherein 12 symbols are used to transmit the data, and wherein 2 symbols are idle; or
   the period of the subframe in the first data frame comprises 14 symbols, wherein 14 symbols are used to transmit the data; or
   the period of the subframe in the first data frame comprises 14 symbols, wherein 1 symbol is used to transmit a synchronization signal; or
   the period of the subframe in the first data frame comprises 14 symbols, wherein 2 symbols are used to transmit the synchronization signal; or
   the period of the subframe in the first data frame comprises 12 symbols, wherein 6 symbols are used to transmit the data, and wherein 6 symbols are idle; or
   the period of the subframe in the first data frame comprises 12 symbols, wherein 8 symbols are used to transmit the data, and wherein 4 symbols are idle; or
   the period of the subframe in the first data frame comprises 12 symbols, wherein 10 symbols are used to transmit the data, and wherein 2 symbols are idle; or
   the period of the subframe in the first data frame comprises 12 symbols, wherein 12 symbols are used to transmit the data; or
   the period of the subframe in the first data frame comprises 12 symbols, wherein 1 symbol is used to transmit the synchronization signal; or
   the period of the subframe in the first data frame comprises 12 symbols, wherein 2 symbols are used to transmit the synchronization signal.

7. A transmission method, comprising:
   receiving M second data frames that are sent by a first communications device using a licensed carrier, wherein at least one data frame in the M second data frames carries first information, wherein the first information comprises information required for detecting a first data frame that is sent by the first communications device using an unlicensed carrier, and wherein M is an integer not less than 1; and
   starting to detect the first data frame according to the first information when or after the first information is obtained.

8. The transmission method according to claim 7, wherein the first information comprises information used to indicate a frame structure of the first data frame or information used to indicate a subframe structure of the first data frame.

9. The transmission method according to claim 7, wherein the first information comprises at least one of a first time offset of the first data frame, information used to indicate a frame structure of the first data frame, information used to indicate a subframe structure of the first data frame, and second information used to trigger detection of the first data frame on the unlicensed carrier.

10. The transmission method according to claim 9, wherein the first information comprises the first time offset of the first data frame, and wherein the first time offset represents:
    a time difference between a start moment of the first data frame and a start moment of a data frame in the M second data frames; or
    a time difference between a start moment of a subframe in the first data frame and a start moment of a subframe in a data frame in the M second data frames.

11. The transmission method according to claim 10, wherein the first time offset comprises at least one of an absolute time difference, a quantity of collection points, and a quantity of symbols.

12. The transmission method according to claim 8, wherein the subframe structure of the first data frame comprises:

a period of a subframe in the first data frame comprises 14 symbols, wherein 7 symbols are used to transmit data, and wherein 7 symbols are idle; or the period of the subframe in the first data frame comprises 14 symbols, wherein 10 symbols are used to transmit the data, and wherein 4 symbols are idle; or the period of the subframe in the first data frame comprises 14 symbols, wherein 12 symbols are used to transmit the data, and wherein 2 symbols are idle; or the period of the subframe in the first data frame comprises 14 symbols, wherein 14 symbols are used to transmit the data; or the period of the subframe in the first data frame comprises 14 symbols, wherein 1 symbol is used to transmit a synchronization signal; or the period of the subframe in the first data frame comprises 14 symbols, wherein 2 symbols are used to transmit the synchronization signal; or the period of the subframe in the first data frame comprises 12 symbols, wherein 6 symbols are used to transmit the data, and wherein 6 symbols are idle; or the period of the subframe in the first data frame comprises 12 symbols, wherein 8 symbols are used to transmit the data, and wherein 4 symbols are idle; or the period of the subframe in the first data frame comprises 12 symbols, wherein 10 symbols are used to transmit the data, and wherein 2 symbols are idle; or the period of the subframe in the first data frame comprises 12 symbols, wherein 12 symbols are used to transmit the data; or the period of the subframe in the first data frame comprises 12 symbols, wherein 1 symbol is used to transmit the synchronization signal; or the period of the subframe in the first data frame comprises 12 symbols, wherein 2 symbols are used to transmit the synchronization signal.

13. A communications device, comprising:
a processor;
a memory;
a bus system; and
a transmitter,
wherein the processor, the memory, and the transmitter are connected to each other using the bus system,
wherein the transmitter is configured to:
  send a first data frame to another communications device using an unlicensed carrier; and
  send M second data frames to the other communications device using a licensed carrier, wherein at least one data frame in the M second data frames carries first information, wherein the first information includes information required for detecting the first data frame by the other communications device, and wherein M is an integer not less than 1.

14. The communications device according to claim 13, wherein the processor is configured to determine whether the transmitter has sent the first data frame, and wherein the first information sent by the transmitter comprises information used to indicate a frame structure of the first data frame or information used to indicate a subframe structure of the first data frame when the processor determines that the transmitter has not sent the first data frame.

15. The communications device according to claim 13, wherein the processor is further configured to deters e whether the transmitter has sent the first data frame, and wherein the first information sent by the transmitter comprises at least one of a first time offset of the first data frame, information used to indicate a frame structure of the first data frame, information used to indicate a subframe structure of the first data frame, and second information used to trigger the other communications device to detect the first data frame on the unlicensed carrier when the processor determines that the transmitter is sending the first data frame, or the transmitter has sent the first data frame.

16. The communications device according to claim 15, wherein the first information comprises the first time offset of the first data frame, and wherein the first time offset represents:
a time difference between a start moment of the first data frame and a start moment of a data frame in the NI second data frames; or
a time difference between a start moment of a subframe in the first data frame and a start moment of a subframe in a data frame in the M second data frames.

17. The communications device according to claim 16, wherein the first time offset comprises at least one of an absolute time difference, a quantity of collection points, and a quantity of symbols.

18. The communications device according to claim 13, wherein the subframe structure of the first data frame sent by the transmitter comprises:
a period of a subframe in the first data frame comprises 14 symbols, wherein 7 symbols are used to transmit data, and wherein 7 symbols are idle; or the period of the subframe in the first data frame comprises 14 symbols, wherein 10 symbols are used to transmit the data, and wherein 4 symbols are idle; or the period of the subframe in the first data frame comprises 14 symbols, wherein 12 symbols are used to transmit the data, and wherein 2 symbols are idle; or the period of the subframe in the first data frame comprises 14 symbols, wherein 14 symbols are used to transmit the data; or the period of the subframe in the first data frame comprises 14 symbols, wherein 1 symbol is used to transmit a synchronization signal; or the period of the subframe in the first data frame comprises 14 symbols, wherein 2 symbols are used to transmit the synchronization signal; or the period of the subframe in the first data frame comprises 12 symbols, wherein 6 symbols are used to transmit the data, and 6 symbols are idle; or the period of the subframe in the first data frame comprises 12 symbols, wherein 8 symbols are used to transmit the data, and wherein 4 symbols are idle; or the period of the subframe in the first data frame comprises 12 symbols; wherein 10 symbols are used to transmit the data, and 2 symbols are idle; or the period of the subframe in the first data frame comprises 12 symbols, wherein 12 symbols are used to transmit the data; or the period of the subframe in the first data frame comprises 12 symbols, wherein 1 symbol is used to transmit the synchronization signal; or the period of the subframe in the first data frame comprises 12 symbols, wherein 2 symbols are used to transmit the synchronization signal.

* * * * *

UNITED STATES PATENT AND TRADEMARK OFFICE
CERTIFICATE OF CORRECTION

PATENT NO. : 10,111,221 B2
APPLICATION NO. : 15/315158
DATED : October 23, 2018
INVENTOR(S) : Jian Wang Page 1 of 1

It is certified that error appears in the above-identified patent and that said Letters Patent is hereby corrected as shown below:

In the Claims

Column 43, Line 63: "deters e" should read "determine"

Column 44, Line 15: "NI" should read "M"

Signed and Sealed this
Eleventh Day of December, 2018

Andrei Iancu
*Director of the United States Patent and Trademark Office*